US005724425A

United States Patent [19]
Chang et al.

[11] Patent Number: 5,724,425
[45] Date of Patent: Mar. 3, 1998

[54] METHOD AND APPARATUS FOR ENHANCING SOFTWARE SECURITY AND DISTRIBUTING SOFTWARE

[75] Inventors: Sheue-Ling Chang, Cupertino; James Gosling, Woodside, both of Calif.

[73] Assignee: Sun Microsystems, Inc.

[21] Appl. No.: 258,244

[22] Filed: Jun. 10, 1994

[51] Int. Cl.$^6$ .................. H04L 9/00; H04L 9/30; H04L 9/32
[52] U.S. Cl. .................. 380/25; 380/4; 380/23; 380/30; 380/49; 380/50
[58] Field of Search .................. 380/4, 23, 25, 380/30, 49, 50

[56] References Cited

U.S. PATENT DOCUMENTS

| | | | |
|---|---|---|---|
| 4,558,176 | 12/1985 | Arnold et al. | 380/4 |
| 4,634,807 | 1/1987 | Chorley et al. | 380/4 |
| 4,670,857 | 6/1987 | Rackman | 380/4 |
| 5,343,527 | 8/1994 | Moore | 380/4 |

OTHER PUBLICATIONS

Davida et al., "Defending Systems Against Viruses through Cryptographic Authentication", IEEE Symposium, 1989, pp. 312-318.

RSA Data Security, Inc., "RSA Certificate Services", Jul. 15, 1993, pp. 1-41.

*Primary Examiner*—Bernarr E. Gregory
*Attorney, Agent, or Firm*—McCutchen, Doyle, Brown & Enersen LLP; Ronald S. Laurie, Esq.; Joseph Yang

[57] ABSTRACT

Source code to be protected, a software application writer's private key, along with an application writer's license provided to the first computer. The application writer's license includes identifying information such as the application writer's name as well as the application writer's public key. A compiler program executed by the first computer compiles the source code into binary code, and computes a message digest for the binary code. The first computer then encrypts the message digest using the application writer's private key, such that the encrypted message digest is defined as a digital "signature" of the application writer. A software passport is then generated which includes the application writer's digital signature, the application writer's license and the binary code. The software passport is then distributed to a user using any number of software distribution models known in the industry. A user, upon receipt of the software passport, loads the passport into a computer which determines whether the software passport includes the application writer's license and digital signature. In the event that the software passport does not include the application writer's license, or the application writer's digital signature, then the user's computer system discards the software passport and does not execute the binary code. As an additional security step, the user's computer computes a second message digest for the software passport and compares it to the first message digest, such that if the first and second message digests are not equal, the software passport is also rejected by the user's computer and the code is not executed. If the first and second message digests are equal, the user's computer extracts the application writer's public key from the application writer's license for verification. The application writer's digital signature is decrypted using the application writer's public key. The user's computer then compares a message digest of the binary code to be executed, with the decrypted application writer's digital signature, such that if they are equal, the user's computer executes the binary code.

72 Claims, 5 Drawing Sheets

METHOD AND APPARATUS FOR ENHANCING SOFTWARE SECURITY AND DISTRIBUTING SOFTWARE

BACKGROUND OF THE INVENTION

1. Field of the Invention

The present invention relates to the use of public key encryption, and more particularly, the present invention relates to the use of public key encryption to achieve enhanced security and product authentication in the distribution of software.

2. Art Background

Public key encryption is based on encryption algorithms that have two keys. One key used for encryption, and the other key is used for decryption. There is a known algorithm that computes the second key given the first. However, without full knowledge of all the parameters, one cannot compute the first key given the second key. The first key is referred to as the "private key", and the second key is referred to as the "public key". In practice, either the private key or the public key may be used to encrypt a message, with the opposite key used to decrypt it. In general, the private key must be kept private, but the public key may be provided to anyone. A variety of public key cryptographic schemes have been developed for the protection of messages and data (See, Whitfield Diffie, "The First Ten Years of Public Key Cryptography" (IEEE Proceedings, Vol. 76, No. 5, 1988) and Fahn, "Answers to Frequently Asked Questions about Today's Cryptography (RSA Laboratories 1992).

Public key cryptography is used to send secure messages across public communication links on which an intruder may eavesdrop, and solves the problem of sending the encryption password to the other side securely.

Public key systems may also be used to encrypt messages, and also to effectively sign messages, allowing the received party to authenticate the sender of the message. One can also use public key cryptography to seal or render tamper-proof a piece of data. In such event, the sender computes a message digest from the data using specially designed cryptographically strong digests designed for this purpose. The sender then uses the private key to encrypt the message digest, wherein this encrypted message digest is called a digital "signature". The sender then packages the data, the message digest and the public key together. The receiver may check for tampering by computing the message digest again, then decrypting the received message digest with the public key. If the recomputed and decrypted message digests are identical, there was no tampering of the data.

"Viruses" and "worms" are computer code cleverly inserted into legitimate programs which are subsequently executed on computers. Each time the program is executed the virus or worm can cause damage to the system by destroying valuable information, and/or further infect and spread to other machines on the network. While there are subtle differences between a virus and a worm, a critical component for both is that they typically require help from an unsuspecting computer user to successfully infect a computer or a corporate network.

Infection of computers by viruses and worms is a general problem in the computer industry today. In addition, corporate networks are vulnerable to frontal assaults, where an intruder breaks into the network and steals or destroys information. Security breaches of any kind on large corporate networks are a particularly worrisome problem, because of the potential for large-scale damage and economic loss.

Moreover, security breaches are more easily accomplished when a corporate network is connected to a public network, such as the Internet. Companies take a variety of measures to guard against breaches of network security, either through frontal assaults or infections, without cutting themselves off from the benefits of being connected to a world-wide network.

The solution adopted by most companies that wish to reap the benefits of connecting to the Internet, while maintaining security, is the installation of a firewall. Firewalls generally restrict Internet file transfers and telnet connections. Such transfers and connections can only be initiated from within the corporate network, such that externally initiated file transfers and telnet connections are refused by the firewall. Firewalls allow electronic mail and network news to freely flow inside the firewall's private network. The use of corporate firewalls allows employees to readily exchange information within the corporate environment, without having to adopt extreme security measures. A good firewall implementation can defend against most of the typical frontal assaults on system security.

One method of preventing viruses and worms from infecting a corporate network is to never execute a program that may contain viruses. In general, programs legitimately deployed throughout the corporate network should be considered virus free. All binary executables, all unreviewed shell scripts, and all source code fetched from outside the firewall are software that may contain a worm or virus.

However, outside binary executables, shell scripts, and source code may enter a corporate firewall through an E-mail attachment. For example, the shell scripts that are used to make and send multiple files using E-mail and the surveytools that start up by activating the E-mail attachment may allow virus entry. Executables can also be directly fetched through the iftp program, through a world-wide web browser such as Mosaic, or from an outside contractor whose network has already been compromised.

In addition, the commercial software release and distribution process presents security and authentication problems. For example, some of the information associated with software, such as the originating company or author, restricted rights legends, and the like are not attached to the code itself. Instead, such information is provided as printed matter, and is separated from the code once the package is opened and the code installed. Even applications that attempt to identify themselves on start-up are susceptible to having the identification forged or otherwise counterfeited.

A user has no mechanism to authenticate that the software sold is actually from the manufacturer shown on the label. Unauthorized copying and the sale of software is a significant problem, and users who believe that they are buying software with a manufacturer's warranty instead purchase pirated software, with neither a warranty nor software support. The problem of authenticating the original source of the software is accentuated when software is intended to be distributed through networks, and a user's source for the software may be far removed from the original writer of the software. In addition, a user does not have that ability to verify that the software purchased contains only the original manufacturer's code. A user also does not have a method for detecting any tampering, such as the existence of a virus, that may cause undesirable effects.

All of the above problems are related to the transport of software both from manufacturers to users and from user to user. Furthermore, the transport problem is independent of the transport medium. The problem applies to all transport media, including floppy disk, magnetic tape, CD-ROM and networks.

As will be described, the present invention provides a method and apparatus for authenticating that software distributed by a manufacturer is a legitimate copy of an authorized software release, and that the software contains only the original manufacturers code without tampering. The present invention solves the above identified problems through the use of a "software passport" which includes the digital signature of the application writer and manufacturer. As will be described, the present invention may also be used to protect intellectual property, in the form of copyrighted computer code, by utilizing cryptographic techniques referred to herein as public key encryption.

SUMMARY OF THE INVENTION

This invention provides a method and apparatus utilizing public key encryption techniques for enhancing software security and for distributing software. The present invention includes a first computer which is provided with source code to be protected using the teachings of the present invention. In addition, a software application writer's private key, along with an application writer's license provided to the first computer. An application writer generally means a software company such as Microsoft Corporation, Adobe or Apple Computer, Inc. The application writer's license includes identifying information such as the application writer's name as well as the application writer's public key. A compiler program executed by the first computer compiles the source code into binary code, and computes a message digest for the binary code. The first computer then encrypts the message digest using the application writer's private key, such that the encrypted message digest is defined as a digital "signature" of the application writer. A software passport is then generated which includes the application writer's digital signature, the application writer's license and the binary code. The software passport is then distributed to a user using any number of software distribution models known in the industry.

A user, upon receipt of the software passport, loads the passport into a computer which determines whether the software passport includes the application writer's license and digital signature. In the event that the software passport does not include the application writer's license, or the application writer's digital signature, then the user's computer system discards the software passport and does not execute the binary code. As an additional security step, the user's computer computes a second message digest for the software passport and compares it to the first message digest, such that if the first and second message digests are not equal, the software passport is also rejected by the user's computer and the code is not executed. If the first and second message digests are equal, the user's computer extracts the application writer's public key from the application writer's license for verification. The application writer's digital signature is decrypted using the application writer's public key. The user's computer then compares a message digest of the binary code to be executed, with the decrypted application writer's digital signature, such that if they are equal, the user's computer executes the binary code. Accordingly, software products distributed with the present invention's software passport permits the user's computer to authenticate the software as created by an authorized application writer who has been issued a valid application writer's license. Any unauthorized changes to the binary code comprising the distributed software is evident through the comparison of the calculated and encrypted message digests.

The present invention is also described with reference to an embodiment used by computing platforms designed to execute only authorized software. A platform builder provides an application writer with a platform builder's digital signature which is included in the application writer's license. The first computer compiles the software into binary code and computes a first message digest for the binary code. The first computer further encrypts the first message digest using the application writer's private key, such that the encrypted first message digest is defined as the application writer's digital signature. A software passport is generated which includes the application writer's digital signature, the application writer's license and the binary code. The software passport is then distributed to a user through existing software distribution channels. The user's computing platform, which may be a computer, a video game box or a set top box, is provided with the platform builder's public key. Upon receipt of the software passport, the computing platform determines if the software passport includes an application writer's license. If it does not, the hardware platform rejects the execution of the code. If a software passport is present, the hardware platform extracts the application writer's license from the passport and determines whether or not the passport includes the platform builder's signature. The platform builder's signature is then decrypted using the public key provided in the platform. The computing platform recomputes the message digest of the application writer's license, and compares the received message digest with the recomputed message digest, such that if the digests are not equal, the software passport is not considered genuine and is rejected. If the message digests are equal, the hardware platform extracts the application writer's public key from the application writer's license, and extracts the application writer's digital signature. The hardware platform then recomputes the message digest of the binary code comprising the application software to be executed, and decrypts the application writer's digital signature using the application writer's public key. The hardware platform then compares the recomputed message digest for the binary code with the application writer's decrypted signature, such that if they are equal, the binary code is executed by the hardware platform. If the recomputed message digest and the application writer's decrypted signature are not equal, the software passport is rejected and the code is not executed.

NOTATION AND NOMENCLATURE

Figure 1:
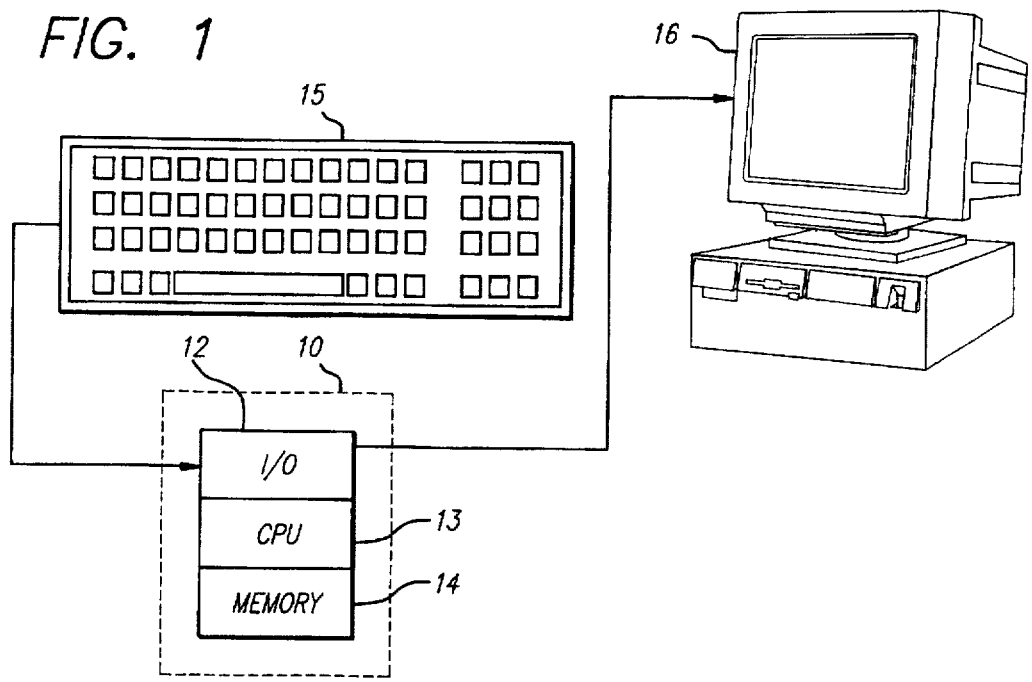
FIG. 1 illustrates a data processing system incorporating the teachings of the present invention.

The detailed descriptions which follow are presented largely in terms of symbolic representations of operations of data processing devices. These process descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities may take the form of electrical or magnetic signals capable of being stored, transferred, combined, compared, displayed and otherwise manipulated. It proves convenient at times, principally for reasons of common usage, to refer to these signals as bits, values, messages, names, elements, symbols, operations, messages, terms, numbers, or the like. It should be borne in mind, however, that all of these similar terms are to be associated with the appropriate physical quantities and are merely convenient labels applied to these quantities.

In the present invention, the operations referred to are machine operations. Useful machines for performing the operations of the present invention include general purpose digital computers or other similar devices. In all cases, the reader is advised to keep in mind the distinction between the method operations of operating a computer and the method of computation itself. The present invention relates to method steps for operating a computer, coupled to a series of networks, and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The method/process steps presented herein are not inherently related to any particular computer or other apparatus. Various general purpose machines may be used with programs in accordance with the teachings herein, or it may prove more convenient to construct specialized apparatus to perform the required method steps. The required structure for a variety of these machines will be apparent from the description given below.

DETAILED DESCRIPTION OF THE INVENTION

In the following description, numerous specific details are set forth such as system configurations, representative data, computer code organization, encryption methods, and devices, etc., to provide a thorough understanding of the present invention. However, it will be apparent to one skilled in the art that the present invention may be practiced without these specific details. In other instances, well known circuits and structures are not described in detail in order to not obscure the present invention. Moreover, certain terms such as "knows", "verifies", "compares", "examines", "utilizes", "finds", "determines", "challenges", "authenticates", etc., are used in this Specification and are considered to be terms of art. The use of these terms, which to a casual reader may be considered personifications of computer or electronic systems, refers to the functions of the system as having human-like attributes, for simplicity. For example, a reference herein to an electronic system as "determining" something is simply a shorthand method of describing that the electronic system has been programmed or otherwise modified in accordance with the teachings herein. The reader is cautioned not to confuse the functions described with everyday human attributes. These functions are machine functions in every sense.

Exemplary Hardware

FIG. 1 illustrates a data processing system in accordance with the teachings of the present invention. Shown is a computer 10, which comprises three major components. The first of these is an input/output (I/O) circuit 12 which is used to communicate information in appropriately structured form to and from other portions of the computer 10. In addition, computer 10 includes a central processing (CPU) 13 coupled to the I/O circuit 12 and a memory 14. These elements are those typically found in most general purpose computers and, in fact, computer 10 is intended to be representative of a broad category of data processing devices. Also, the computer 10 may be coupled to a network, in accordance with the teachings herein. The computer 10 may further include encrypting and decrypting circuitry incorporating the present invention, or as will be appreciated, the present invention may be implemented in software executed by computer 10. A raster display monitor 16 is shown coupled to the I/O circuit 12 and issued to display images generated by CPU 13 in accordance with the present invention. Any well known variety of cathode ray tube (CRT) or other type of display may be utilized as display 16.

The present invention's software passport identifies a portion of software, or some machine code (hereinafter "code"), in a manner similar to how a physical passport identifies a person. The concept is similar to the real-life passport system which forms the basis of a trust model among different nations. Physical passports enable border entry officers to identify each individual and make certain decisions based on his/her passport. As will be described below, a software passport is a modern release process for distributing software products. A software passport gives a software product an identity and a brand name. The software passport provides the basis of a trust model and allows computer users to identify and determine the genuineness of a software product based on the information contained in its passport.

Figure 2:
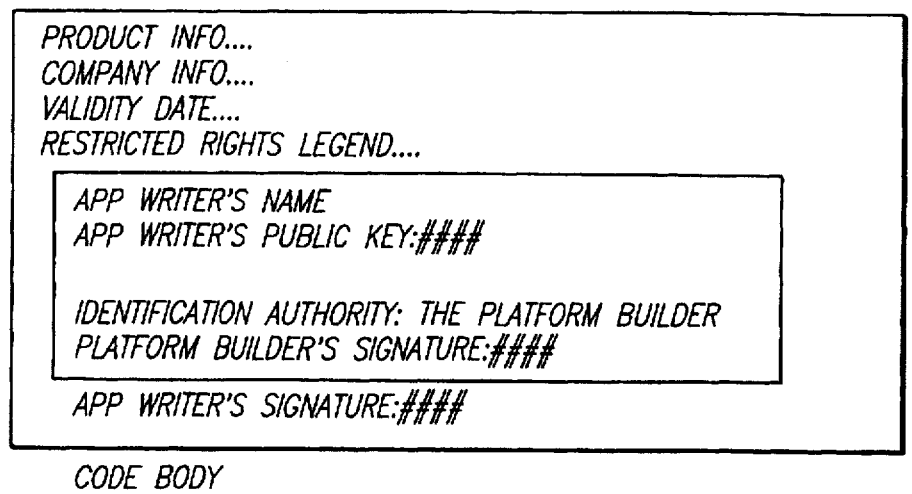
FIG. 2 conceptually illustrates use of the present invention's software passport where the application code and the software passport are provided in separate files.
Figure 3:
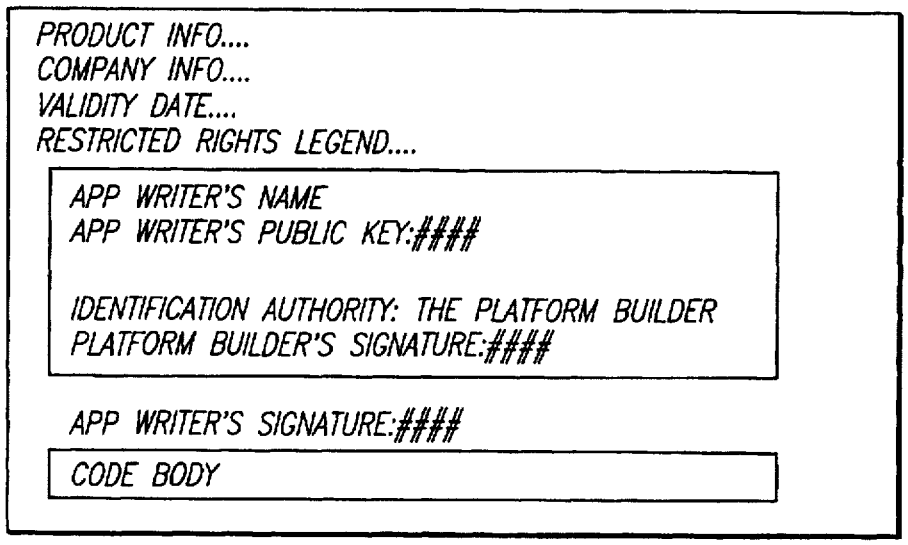
FIG. 3 conceptually illustrates use of the present invention's use of the software passport where the application code and the software passport are distributed in the same file.

Referring now to FIG. 2, the present invention is illustrated in conceptual form for the case where the computer code (comprising a piece of software) and the software passport are in separate files. FIG. 3 illustrates the use of the present invention where the computer code comprising a piece of software and the software passport are in the same file.

As illustrated in FIGS. 2 and 3, the information included in the present invention's software passport may include:

product information, such as the software product's name and any other relevant information to the specific product;

company information including the name of the company or the software application writer who has produced the product;

a validity date which includes the issue date of the software passport and the expiration date of the passport;

a restricted rights legend including copyright notices and other similar legends;

the software code body including executable application code distributed to the user;

an application writer's license; and, a software application writer's digital signature.

It will be appreciated that the components of a software passport are generally self-explanatory, with the application writer's license and digital signature explained in more detail below.

SOFTWARE PRODUCER'S DIGITAL SIGNATURE

A digital "signature" is produced by using certain cryptographic techniques of computing a message digest of a piece of software code (hereinafter "code"), and encrypting the message digest using the signer's private key. There are many known message digest algorithms, such as the MD2, MD4, and MD5 algorithms published by RSA, Inc. The use of private cryptographic techniques makes this signature very difficult to forge since the signer keeps the private key secret. The reader is referred to the papers by Whitfield Diffie, "The First Ten Years of Public Key Cryptography", Vol. 76, No. 5 (IEEE Proceedings, May 1988), which is attached hereto as Appendix A; and Whitfield Diffie, et al., "Authentication and Authenticated Key Exchanges" (1992 Kluwer Academic Publishers) attached hereto as Appendix B, for a detailed description of the operation of Diffie-Helman certificates and public key cryptography.

One may conceptualize the computing of the message digest for a piece of code as a mechanism of taking a photo snapshot of the software. When the code changes, its message digest reflects any differences. In the system of the present invention, this "digital signature" is stamped on the product prior to its release. The digital signature associates a product with the entity that has produced it, and enables consumers to evaluate the quality of a product based on the reputation of the producer. The signature also permits a consumer to distinguish the genuineness of a product.

SOFTWARE PRODUCER'S LICENSE

The present invention's software producer's license (at time referred to herein as the "application writer's license") is an identification similar to the home repair contractor's license issued by a state. A software producer's license identifies and certifies that the producer is authorized to perform certain software production activities. It is contemplated that the software producer's license will be issued by some commonly-trusted authority established by the computer software industry. Before issuing an license to a software producer, this authority performs a defined process to authenticate the person or company, and to verify their job skill; as a state does before issuing a contractor's license. For convenience, in this Specification, this commonly-trusted entity is referred to as the Software Publishing Authority ("SPA").

A software producer's license contains the following information:

the producer's name;

the license's issue date;

the license's expiration date;

the producer's public key;

the name of the issuing authority, SPA; and the SPA's digital signature.

A software producer's license associates an application writer with a name and a public key. It enables a software producer to produce multiple products, and to sign every product produced. The public key embedded in a license belongs to the person who owns the license. This public key can later be used by any third party to verify the producer's digital signature. A user who has purchased a product can determine the genuineness of a product by using the public key embedded in the producer's identification to authenticate the digital signature.

The SPA's digital signature is generated by computing the message digest of the producer's identification and encrypting the message digest using the SPA's private key. Since the SPA's private key is kept private to the SPA, third parties are not able to easily forge the SPA's signature to produce a fake identification.

In accordance with the teachings of the present invention, a software application writer ("SW") supplies three major pieces of information to a compiler prior to compilation of the code:

the source code written by the application writer;

the application writer's private key; and the application writer's license.

The code included in a passport may comprise source code in various computer languages, assembly code, machine binary code, or data. The code may be stored in various formats. For example, a piece of source code may be stored in a clear text form in the passport. A portion of binary executable machine code may also be stored in a compacted format in the passport, using certain well known compaction algorithms such as Huffman encoding. The format used in a particular implementation is indicated by a flag in the passport.

Binary executable code may further be stored in a printable-character set format to allow the passport to be printed. A user would then reverse the printable-format to recover the software. Moreover, code protected by intellectual property, such as copyright or patent, may be stored in an encrypted format in the passport. In such case, it is contemplated that a user may be required to pay a license fee prior to gaining access to the software.

Figure 4:
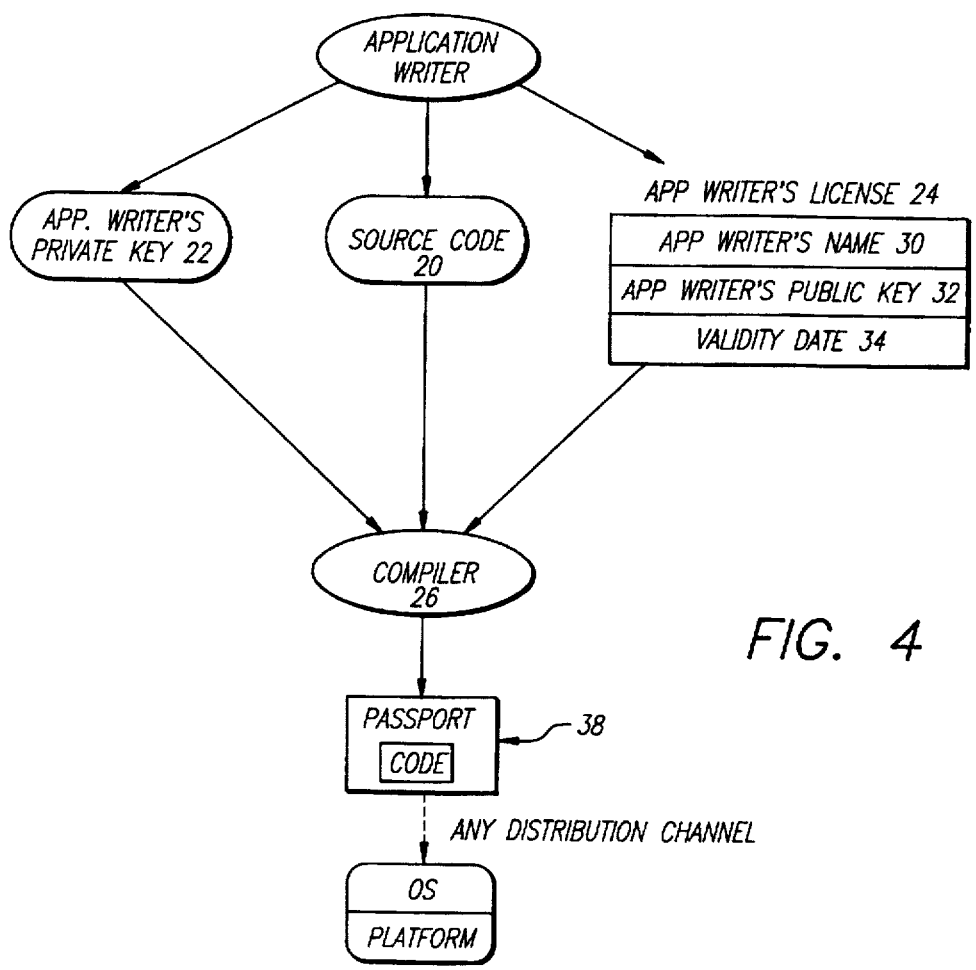
FIG. 4 diagrammatically illustrates the present invention's process for generating a software passport.

Referring now to FIG. 4, to generate the software passport of the present invention, the original source code 20, the application writer's private key 22, and the application writer's license 24 is provided to a compiler 26. As illustrated, the application writer's license 24 includes the writer's name 30, the writer's public key 32 and a validity date 34.

The compiler 26 then compiles the source code 20 into binary code. The compiler 26 further computes the message digest of the binary code, and encrypts the message digest using the private key 22 supplied by the application writer. This encrypted message digest constitutes the application writer's signature.

A digital signature of the application writer is produced and embedded in the passport. The compiler 26 also embeds the application writer's license 24 in the passport. The application writer's license 24 allows any user who has purchased the product to recognize the maker of the product. The application writer's digital signature in the passport allows any user to verify the genuineness of the product. The SPA's digital signature in the application writer's license 24 provides the user with the ability to verify that an application writer is a licensed application writer by using SPA's public key to encrypt the signature.

As shown in FIG. 4, the generated software passport 38, including the application code is then distributed using any desired software distribution model. The passport 38 is received by a user and is executed using an operating system (OS) running on a computer system ("platform") such as the system of FIG. 1.

Figure 5:
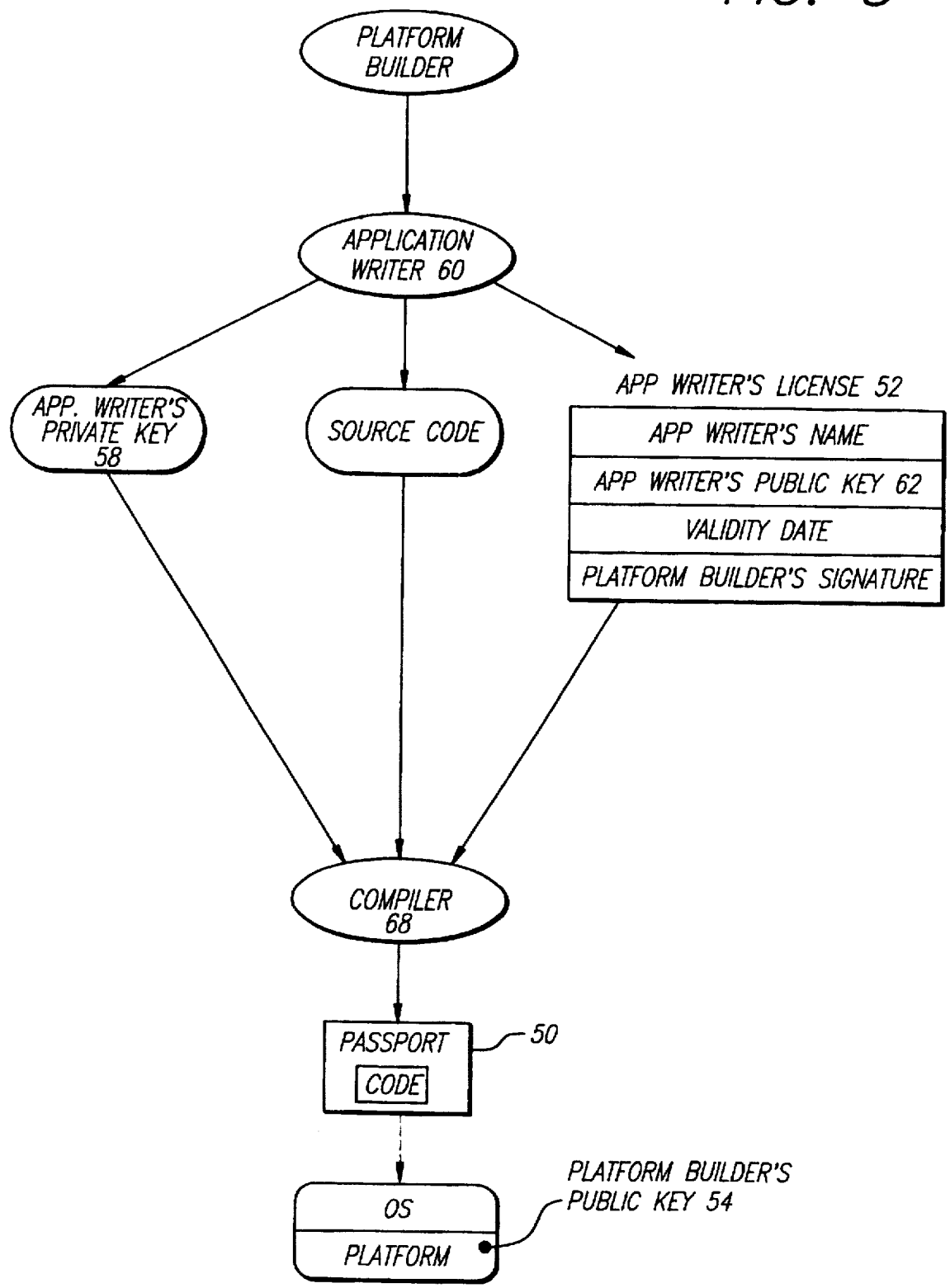
FIG. 5 diagrammatically illustrates the use of the present invention for platform producer licensing.

Referring now to FIG. 5, the use of the present invention by platform builders will be described. In the electronic game industry and the interactive television cable set-top box industry, platform producers often desire to allow only authorized code to be executed on their particular platform. To be able to control the accessibility of a platform, the received code must be identifiable and the platform must be able to identify the software when it arrives. As illustrated in FIG. 5, the present invention may be applied in a platform producer licensing scheme with particular application for use in settop box and video game environments.

Figure 6A:
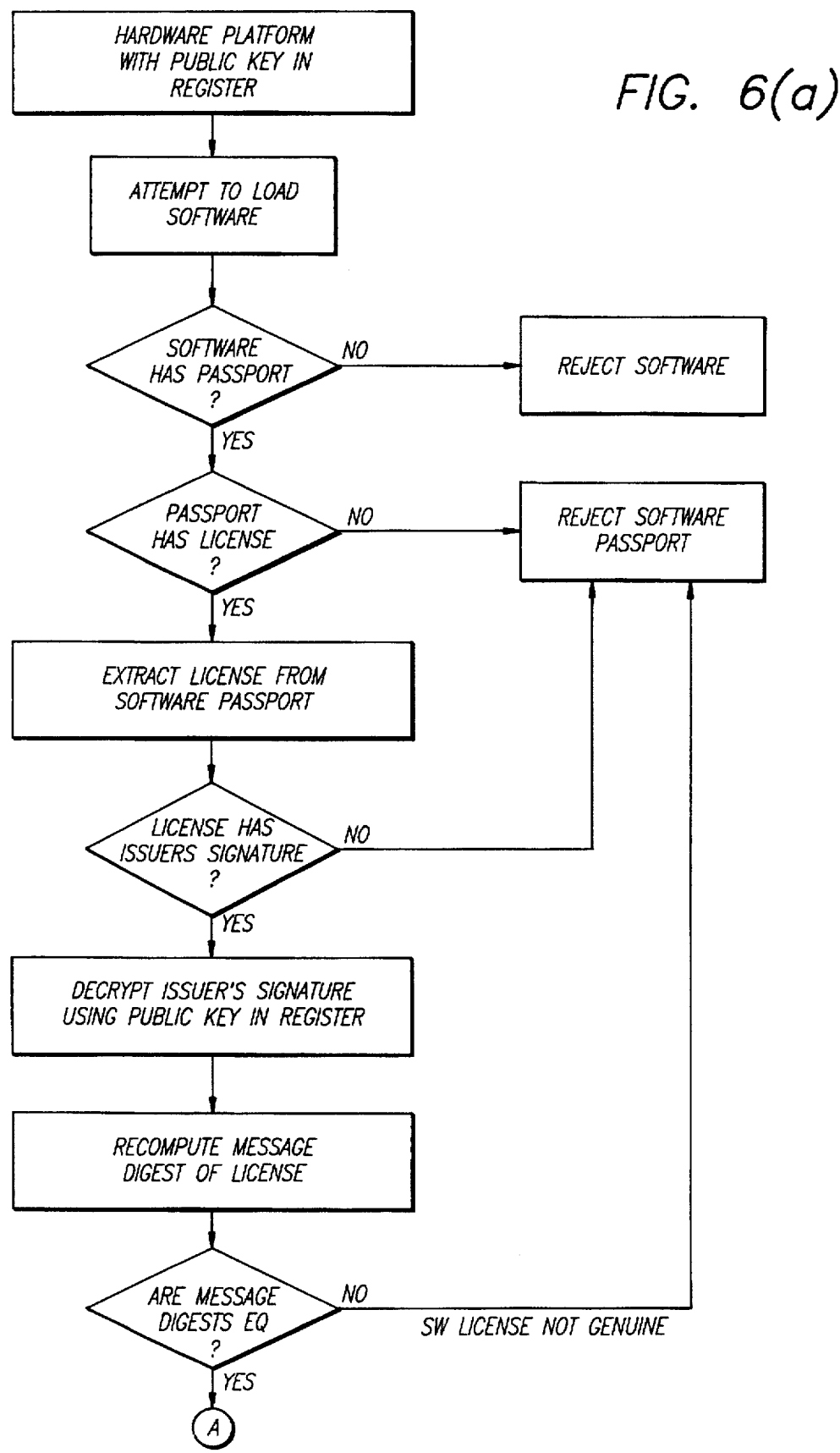
FIGS. 6a and 6b are flowcharts illustrating the steps executed by the present invention for verifying that a valid software license exists, and that the software writer's ("SW's") signature is valid, prior to permitting the execution of a computer program.
Figure 6B:
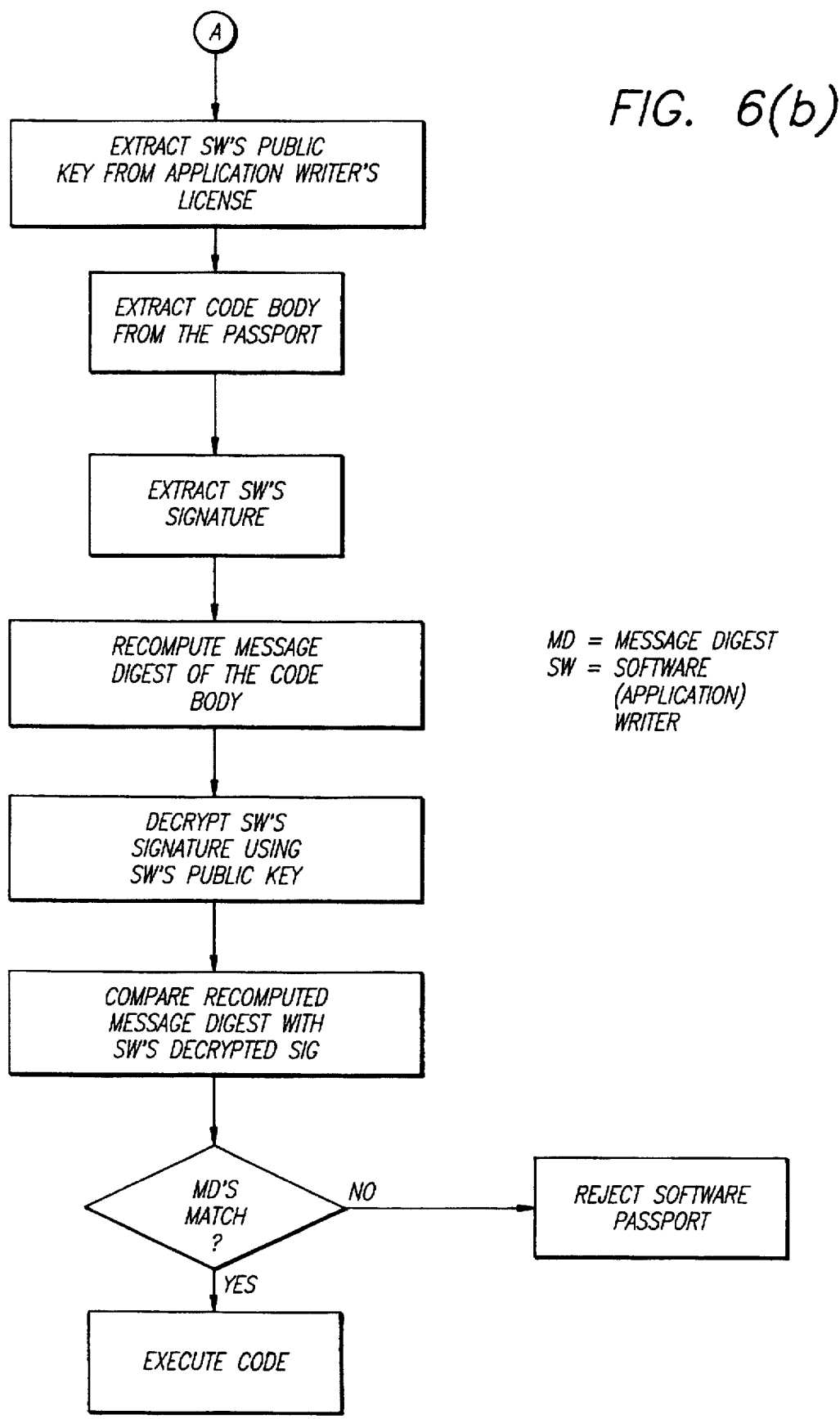

Referring now to FIGS. 6a and 6b, a platform producer may issue a "programmer's license" to a set of application writers (alternatively referred to as "software writers") who are authorized to write application code for a particular platform. A programmer's license issued by a platform producer is similar to the programmer's identification issued by the SPA, except that the license is digitally signed by the platform producer instead of by the SPA. The programmer's license contains the following information:

the producer's name;

the issue license data;

the license expiration date;

the producer's public key;

the issuing authority (the platform producer); and the platform producer's digital signature.

The platform producer's digital signature is generated by computing the message digest of the license, and encrypting the message digest using the platform producer's private key.

The software produced by a licensed application writer will include a valid passport 50 (see FIGS. 5 and 6a) which contains a genuine writer's digital signature, and a valid application writer's license 52 issued by the platform builder. Any application writer who is not authorized by the platform builder will not possess a valid license. Therefore, the software passport generated by an unauthorized person will either have no valid license or no valid signature.

The public key 54 of the platform builder is embedded in the platform (e.g., video game) for the verification process. At execution time, the platform extracts the public key 54 embedded in the system to verify that a passport contains a valid application writer's license 52. The digital signature in the application writer's license is generated by computing the message digest of the license 52 and encrypting the message digest using the platform builder's private key. The system of the present invention can thus recover the original message digest by decrypting the signature using the platform builder's public key 54. The verification process of the application writer's license may be accomplished by:

1. recomputing the message digest of the application license 52 in the passport 50, 2. recovering the original message digest, and 3. comparing the old digest with the newly computed digest.

The passport 50 contains a valid application writer's license if the two message digests are the same. Otherwise the license is not valid. The verification process of the present invention is illustrated in the flow chart of FIG. 6(a).

It will be appreciated that even if the passport 50 does contain a valid application writer's license, the application writer might have stolen the license by copying it from some other authorized writer's passport. In this case, the unauthorized writer would not have a correct private key 58 to forge the signature of the authorized writer. It is contemplated that the system will further verify the signature of the application writer 60. It will be recalled that the application writer's digital signature in the passport was generated by computing the message digest of the passport and encrypting the message digest using the application writer's private key 58. The original message digest may be recovered by decrypting the signature using the writer's public key 62 embedded in the application writer's license 52, which is embedded in the passport 50. The application writer's digital signature may then be verified by:

1. recomputing the message digest of the passport 50, 2. recovering the original message digest, and 3. comparing the old digest with the new digest.

The signature is valid if the two message digests are the same. Otherwise the passport is not valid and the platform will reject the execution of the software. The steps executed by the present invention to verify the application writer's digital signature are illustrated in flow chart for FIG. 6(b).

It will be further noted that the security scheme of the present invention may be used to protect inventions and authorship protected by intellectual property, such as copyrights and patents. The one additional procedure that is added to protect intellectual property is that the compiler (e.g. a compiler 68 shown in FIG. 5) generates encrypted byte codes. When a user attempts to run the code on the platform operating system ("OS") the verification procedures are followed as described above with reference to FIGS. 6(a) and 6(b). However, with the code encrypted, the operating system requires an additional approval before it is permitted to run the code. A cryptographic key is required which essentially results in an IP license to run the code. After authenticating the code, the operating system requests the IP license. The operating system verifies that the IP license is signed by the person who authored the code, and then proceeds to decrypt and execute the code. A further feature of the present invention is that third parties do not have the ability to inspect the code since it is encrypted.

Accordingly, the present invention has disclosed a method and apparatus for enhancing software security. Although the present invention has been described with reference to FIGS. 1–6, it will be apparent that may alternatives, modifications and variations may be made in light of the foregoing description.

APPENDIX A

THE FIRST TEN YEARS OF PUBLIC-KEY CRYPTOGRAPHY

WHITFIELD DIFFIE

Invited Paper

Public-key cryptosystems separate the capacities for encryption and decryption so that 1) many people can encrypt messages in such a way that only one person can read them, or 2) one person can encrypt messages in such a way that many people can read them. This separation allows important improvements in the management of cryptographic keys and makes it possible to 'sign' a purely digital message.

Public key cryptography was discovered in the Spring of 1975 and has followed a surprising course. Although diverse systems were proposed early on, the ones that appear both practical and secure today are all very closely related and the search for new and different ones has met with little success. Despite this reliance on a limited mathematical foundation public-key cryptography is revolutionizing communication security by making possible secure communication networks with hundreds of thousands of subscribers.

Equally important is the impact of public key cryptography on the theoretical side of communication security. It has given cryptographers a systematic means of addressing a broad range of security objectives and pointed the way toward a more theoretical approach that allows the development of cryptographic protocols with proven security characteristics.

I. INITIAL DISCOVERIES

Public key cryptography was born in May 1975, the child of two problems and a misunderstanding.

First came the problem of key distribution. If two people who have never met before are to communicate privately using conventional cryptographic means, they must somehow agree in advance on a key that will be known to themselves and to no one else.

The second problem, apparently unrelated to the first, was the problem of signatures. Could a method be devised that would provide the recipient of a purely digital electronic message with a way of demonstrating to other people that it had come from a particular person, just as a written signature on a letter allows the recipient to hold the author to its contents?

On the face of it, both problems seem to demand the impossible. In the first case, if two people could somehow communicate a secret key from one to the other without ever having met, why could they not communicate their message in secret? The second is no better. To be effective, a signature must be hard to copy. How then can a digital message, which can be copied perfectly, bear a signature?

The misunderstanding was mine and prevented me from rediscovering the conventional key distribution center. The virtue of cryptography, I reasoned, was that, unlike any other known security technology, it did not require trust in any party not directly involved in the communication, only trust in the cryptographic systems. What good would it do to develop impenetrable cryptosystems, I reasoned, if their users were forced to share their keys with a key distribution center that could be compromised by either burglary or subpoena.

The discovery consisted not of a solution, but of the recognition that the two problems, each of which seemed unsolvable by definition, could be solved at all and that the solutions to both problems came in one package.

First to succumb was the signature problem. The conventional use of cryptography to authenticate messages had been joined in the 1950s by two new applications, whose functions when combined constitute a signature.

Beginning in 1952, a group under the direction of Horst Feistel at the Air Force Cambridge Research Center began to apply cryptography to the military problem of distinguishing friendly from hostile aircraft. In traditional Identification Friend or Foe systems, a fire control radar determines the identity of an aircraft by challenging it, much as a sentry challenges a soldier on foot. If the airplane returns the correct identifying information, it is judged to be friendly, otherwise it is thought to be hostile or at best neutral. to allow the correct response to remain constant for any significant period of time, however, is to invite opponents to record a legitimate friendly response and play it back whenever they themselves are challenged. The approach taken by Feistel's group, and now used in the MK XII IFF system, is to vary the exchange cryptographically from encounter to encounter. The radar sends a randomly selected challenge and judges the aircraft by whether it receives a correctly encrypted response. Because the challenges are never repeated, previously recorded responses will not be judged correct by a challenging radar.

Later in the decade, this novel authentication technique was joined by another, which seems first to have been applied by Roger Needham of Cambridge University [112]. This time the problem was protecting computer passwords. Access control systems often suffer from the extreme sensitivity of their password tables. The tables gather all of the passwords together in one place and anyone who gets access to this information can impersonate any of the system's users. To guard against this possibility, the password table is filled not with the passwords themselves, but with the images of the passwords under a one-way function. A one-way function is easy to compute, but difficult to invert. For any password, the correct table entry can be calculated easily. Given an output from the one-way function, however, it is exceedingly difficult to find any input that will produce it. This reduces the value of the password table to an intruder tremendously, since its entries are not passwords and are not acceptable to the password verification routine.

Challenge and response identification and one-way functions provide protection against two quite different sorts of threats. Challenge and response identification resists the efforts of an eavesdropper who can spy on the communication channel. Since the challenge varies randomly from event to event, the spy is unable to replay it and fool the challenging radar. There is, however, no protection against an opponent who captures the radar and learns its cryptographic keys. This opponent can use what he has learned to fool any other radar that is keyed the same. In contrast, the one-way function defeats the efforts of an intruder who captures the system password table (analogous to capturing the radar) but succumbs to anyone who intercepts the login message because the password does not change with time.

I realized that the two goals might be achieved simultaneously if the challenger could pose questions that it was unable to answer, but whose answers it could judge for correctness. I saw the solution as a generalization of the one-way function: a trap-door one-way function that allowed someone in possession of secret information to go backwards and compute the function's inverse. The challenger would issue a value in the range of the one-way function and demand to know its inverse. Only the person who knew the trapdoor would be able to find the corresponding element in the domain, but the challenger, in possession of an algorithm for computing the one-way function, could readily check the answer. In the applications that later came to seem most important, the role of the challenge was played by a message and the process took on the character of a signature, a digital signature.

It did not take long to realize that the trap-door one-way function could also be applied to the baffling problem of key distribution. For someone in possession of the forward form of the one-way function to send a secret message to the person who knew the trapdoor, he had only to transform the message with the one-way function. Only the holder of the trap-door information would be able to invert the operation and recover the message. Because knowing the forward form of the function did not make it possible to compute the inverse, the function could be made freely available. It is this possibility that gave the field its name: public-key cryptography.

The concept that emerges is that of a public-key cryptosystem: a cryptosystem in which keys come in inverse pairs [36] and each pair of keys has two properties.

Anything enclosed with one key can be decrypted with the other.

Given one member of the pair, the public key, it is infeasible to discover the other, the secret key.

This separation of encryption and decryption makes it possible for the subscribers to a communication system to list their public keys in a "telephone directory" along with their names and addresses. This done, the solutions to the original problems can be achieved by simple protocols.

One subscriber can send a private message to another simply by looking up the addressee's public key and using it to encrypt the message. Only the holder of the corresponding secret key can read such a message; even the sender, should he lose the plaintext, is incapable of extracting it from the ciphertext.

A subscriber can sign a message by encrypting it with his own secret key. Anyone with access to the public key can verify that it must have been encrypted with the corresponding secret key, but this is of no help to him in creating (forging) a message with this property.

The first aspect of public-key cryptography greatly simplifies the management of keys, especially in large communication networks. In order for a pair of subscribers to communicate privately using conventional end-to-end cryptography, they must both have copies of the same cryptographic key and this key must be kept secret from anyone they do not wish to take into their confidence. If a network has only a few subscribers, each person simply stores one key for every other subscriber against the day he will need it, but for a large network, this is impractical.

In a network with n subscribers there are $n(n-1)/2$ pairs, each of which may require a key. This amounts to five thousand keys in a network with only a hundred subscribers, half a million in a network with one thousand, and twenty million billion in a network the size of the North American telephone system. It is unthinkable to distribute this many keys in advance and undesirable to postpone secure communication while they are carried from one party to the other by courier.

The second aspect makes it possible to conduct a much broader range of normal business practices over a telecommunication network. The availability of a signature that the receiver of a message cannot forge and the sender cannot readily disavow makes it possible to trust the network with negotiations and transactions of much higher value than would otherwise be possible.

It must be noted that both problems can be solved without public-key cryptography, but that conventional solutions come at a great price. Centralized key distribution centers can on request provide a subscriber with a key for communicating with any other subscriber and protocols for this purpose will be discussed later on. The function of the signature can also be approximated by a central registry that records all transactions and bears witness in cases of dispute. Both mechanisms, however, encumber the network with the intrusion of a third party into many conversations, diminishing security and degrading performance.

At the time public-key cryptography was discovered, I was working with Martin Hellman in the Electrical Engineering Department at Stanford University. It was our immediate reaction, and by no means ours alone, that the problem of producing public-key cryptosystems would be quite difficult. Instead of attacking this problem in earnest, Marty and I forged ahead in examining the consequences.

The first result of this examination to reach a broad audience was a paper entitled "Multi-User Cryptographic Techniques" [35], which we gave at the National Computer Conference in 1976. We wrote the paper in December 1975 and sent preprints around immediately. One of the preprints went to Peter Blatman, a Berkeley graduate student and friend since childhood of cryptography's historian David Kahn. The result was to bring from the woodwork Ralph Merkle, possibly the single most inventive character in the public-key saga.

Merkle's Puzzles

Ralph Merkle had registered in the Fall of 1974 for Lance Hoffman's course in computer security at U.C. Berkeley. Hoffman wanted term papers and required each student to submit a proposal early in the term. Merkle addressed the problem of public-key distribution or as he called it "Secure Communication over Insecure Channels" [70]. Hoffman could not understand Merkle's proposal. He demanded that it be rewritten, but alas found the revised version no more comprehensible than the original. After one more iteration of this process, Merkle dropped the course, but he did not cease working on the problem despite continuing failure to make his results understood.

Although Merkle's original proposal may have been hard to follow, the idea is quite simple. Merkle's approach is to communicate a cryptographic key from one person to another by hiding it in a large collection of puzzles. Following the tradition in public-key cryptography the parties to this communication will be called Alice and Bob rather than the faceless A and B, X and Y, or I and J, common in technical literature.

Alice manufactures a million or more puzzles and sends them over the exposed communication channel to Bob. Each puzzle contains a cryptographic key in a recognizable standard format. The puzzle itself is a cryptogram produced by a block cipher with a fairly small key space. As with the number of puzzles, a million is a plausible number. When Bob receives the puzzles, he picks one and solves it, by the simple expedient of trying each of the block cipher's million keys in turn until he finds one that results in plaintext of the correct form. This requires a large but hardly impossible amount of work.

In order to inform Alice which puzzle he has solved, Bob uses the key it contains to encrypt a fixed test message, which he transmits to Alice. Alice now tries her million keys on the test message until she finds the one that works. This is the key from the puzzle Bob has chosen.

The task facing an intruder is more arduous. Rather than selecting one of the puzzles to solve, he must solve on average half of them. The amount of effort he must expend is therefore approximately the square of that expended by the legitimate communicators.

The n to $n^2$ advantage the legitimate communicators have over the intruder is small by cryptographic standards, but sufficient to make the system plausible in some circumstances. Suppose, for example, that the plaintext of each puzzle is 96 bits, consisting of 64 bits of key together with a thirty-two bit block of zeros that enables Bob to recognize the right solution. The puzzle is constructed by encrypting this plaintext using a block cipher with 20 bits of key. Alice produces a million of these puzzles and Bob requires about half a million tests to solve one. The bandwidth and computing power required to make this feasible are large but not inaccessible. On a DS1 (1.544 Mbit) channel it would require about a minute to communicate the puzzles. If keys can be tried on the selected puzzle at about ten-thousand per second, it will take Bob another minute to solve it. Finally, it will take a similar amount of time for Alice to figure out, from the test message, which key has been chosen.

The intruder can expect to have to solve half a million puzzles at half a million tries apiece. With equivalent computational facilities, this requires twenty-five million seconds or about a year. For applications such as authentication, in which the keys are no longer of use after communication is complete, the security of this system might be sufficient.

When Merkle saw the preprint of "Multi-User Cryptographic Techniques" he immediately realized he had found people who would appreciate his work and sent us copies of the paper he had been endeavoring unsuccessfully to publish. We in turn realized that Merkle's formulation of the problem was quite different from mine and, because Merkle had isolated one of the two intertwined problems I had seen, potentially simpler.

Even before the notion of putting trap-doors into one-way functions had appeared, a central objective of my work with Marty had been to identify and study functions that were easy to compute in one direction, but difficult to invert. Three principal examples of this simplest and most basic of cryptographic phenomena occupied our thoughts.

- John Gill, a colleague in the Electrical Engineering Department at Stanford, had suggested discrete exponentiation because the inverse problem, discrete logarithm, was considered very difficult.
- I had sought suitable problems in the chapter on NP-complete functions in Aho, Hopcroft, and Ullman's book on computational complexity [3] and selected the knapsack problem as most appropriate.
- Donald Knuth of the Stanford Computer Science Department had suggested that multiplying a pair of primes was easy, but that factoring the result, even when it was known to have precisely two factors, was exceedingly hard.

All three of these one-way functions were shortly to assume great importance.

II. EXPONENTIAL KEY EXCHANGE

The exponential example was tantalizing because of its combinatorial peculiarities. When I had first thought of digital signatures, I had attempted to achieve them with a scheme using tables of exponentials. This system failed, but Marty and I continued twisting exponentials around in our minds and discussions trying to make them fit. Marty eventually made the breakthrough early one morning in May 1976. I was working at the Stanford Artificial Intelligence Laboratory on the paper that we were shortly to publish under the title "New Directions in Cryptography" [36] when Marty called and explained exponential key exchange in its unnerving simplicity. Listening to him, I realized that the notion had been at the edge of my mind for some time, but had never really broken through.

Exponential key exchange takes advantage of the ease with which exponentials can be computed in a Galois (finite) field GF(q) with a prime number of q of elements (the numbers $\{0, 1, \ldots, q-1\}$ under arithmetic modulo q) as compared with the difficulty of computing logarithms in the same field. If $$Y = \alpha^X \mod q, \text{ for } 1 < X < q-1$$

where $\alpha$ is a fixed primitive element of GF(q) (that is the powers of $\alpha$ produce all the nonzero elements $1, 2, \ldots, q-1$ of GF(q)), then X is referred to as the logarithm of Y to the base $\alpha$, over GF(q):

$$X = \log_\alpha Y \text{ over } GF(q), \text{ for } 1 < Y < q-1,$$

Calculation of Y from X is easy: Using repeated squaring, it takes at most $2 \times \log_2 q$ multiplications. For example $$\alpha^{37} = \alpha^{32+4+1} = ((((\alpha^2)^2)^2)^2) \times (\alpha^2)^2 \times \alpha.$$

Computing X from Y, on the other hand, is typically far more difficult [104], [83], [29]. If q has been chosen correctly, extracting logarithms modulo q requires a precomputation proportional to $$L(q) = e^{\sqrt{\ln q \times \ln \ln q}}$$

though after that individual logarithms can be calculated fairly quickly. The function L(q) also estimates the time needed to factor a composite number of comparable size and will appear again in that context.

To initiate communication Alice chooses a random number $X_A$ uniformly from the integers $1, 2, \ldots, q-1$. She keeps $X_A$ secret, but sends $$Y_A = \alpha^{X_A} \mod q$$

to Bob. Similarly, Bob chooses a random number $X_B$ and sends the corresponding $Y_B$ to Alice. Both Alice and Bob can now compute $$K_{AB} = \alpha^{X_A X_B} \mod q$$

and use this as their key. Alice computes $K_{AB}$ by raising the $Y_B$ she obtained from Bob to the power $X_A$ $$\begin{aligned} K_{AB} &= Y_B^{X_A} \mod q \\ &= (\alpha^{X_B})^{X_A} \mod q \\ &= \alpha^{X_B X_A} = \alpha^{X_A X_B} \mod q \end{aligned}$$

and Bob obtains $K_{AB}$ in a similar fashion $$K_{AB} = Y_A^{X_B} \mod q.$$

No one except Alice and Bob knows either $X_A$ or $X_B$ so anyone else must compute $K_{AB}$ from $Y_A$ and $Y_B$ alone. The equivalence of this problem to the discrete logarithm problem is a major open question in public-key cryptography. To date no easier solution than taking the logarithm of either $Y_A$ or $Y_B$ has been discovered.

If q is a prime about 1000 bits in length, only about 2000 multiplications of 1000-bit numbers are required to compute $Y_A$ from $X_A$, or $K_{AB}$ from $Y_A$ and $X_B$. Taking logarithms over GF(q), on the other hand, currently demands more than $2^{100}$ (or approximately $10^{30}$) operations.

The arithmetic of exponential key exchange is not restricted to prime fields; it can also be done in Galois Fields with $2^n$ elements, or in prime product rings [103], [68]. The '$2^n$' approach has been taken by several people [64], [117], [56] because arithmetic in these fields can be performed with linear shift registers and is much faster than arithmetic over large primes. It has turned out, however, that discrete logarithms can also be calculated much more quickly in '$2^n$' fields and so the sizes of the registers must be about 50 percent greater.

Marty and I immediately recognized that we had a far more compact solution to the key distribution problem than Merkle's puzzles and hastened to add it to both the upcoming National Computer Conference presentation and to "New Directions." The latter now contained a solution to each aspect of the public-key problem, though not the combined solution I had envisioned. It was sent off to the IEEE TRANSACTIONS ON INFORMATION THEORY prior to my departure for NCC and like all of our other papers was immediately circulated in preprint.

III. TRAP-DOOR KNAPSACKS

Later in the same year, Ralph Merkle began work on his best known contribution to public-key cryptography: building trapdoors into the knapsack one-way function to produce the trap-door knapsack public-key cryptosystem.

The knapsack problem is fancifully derived from the notion of packing gear into a knapsack. A shipping clerk faced with an odd assortment of packages and a freight container will naturally try to find a subset of the packages that fills the container exactly with no wasted space. The simplest case of this problem, and the one that has found application in cryptography is the one dimensional case: packing varying lengths of fishing rod into a tall thin tube.

Given a cargo vector of integers $a = (a_1, a_2, \ldots, a_n)$ it is easy to add up the elements of any specified subvector. Presented with an integer S, however, it is not easy to find a subvector of a whose elements sum to S, even if such a subvector is known to exist. This knapsack problem is well known in combinatorics and is believed to be extremely difficult in general. It belongs to the class of NP-complete problems, problems thought not to be solvable in polynomial time on any deterministic computer.

I had previously identified the knapsack problem as a theoretically attractive basis for a one-way function. The cargo vector a can be used to encipher an n-bit message $x=(x_1, x_2, \ldots, x_n)$ by taking the dot product $S=a \cdot x$ as the ciphertext. Because one element of the dot product is binary, this process is easy and simply requires n additions. Inverting the function by finding a binary vector x such that $a \cdot x=S$ solves the knapsack problem and is thus believed to be computationally infeasible if a is randomly chosen. Despite this difficulty in general, many cases of the knapsack problem are quite easy and Merkle contrived to build a trapdoor into the knapsack one-way function by starting with a simple cargo vector and converting it into a more complex form [71].

If the cargo vector a is chosen so that each element is larger than the sum of the preceding elements, it is called superincreasing and its knapsack problem is particularly simple. (In the special case where the components are 1, 2, 4, 8, etc., this is the elementary operation of binary decomposition.) For example, if $a'=(171, 197, 459, 1191, 2410)$ and $S'=3798$ then $x_5$ must equal 1. If it were 0 then even if $x_1, x_2, x_3$, and $x_4$ were all equal to 1, the dot product $a \cdot x$ would be too small. Since $x_5=1$, $S'-a'_5=3797-2410=1387$ must be a sum of a subset of the first four elements of a'. The fact that $1387>a'_4=1191$ means that $x_4$ too must equal 1. Finally $S'-a'_5-a'_4=196=a'_2$ so $x_3=0$, $x_2=1$, and $x_1=0$.

The simple cargo vector a' cannot be used as a public enciphering key because anyone can easily recover a vector x for which $x \cdot a'=S'$ from a' and S' by the process described above. The algorithm for generating keys therefore chooses a random superincreasing cargo vector a' (with a hundred or more components) and keeps this vector secret. It also generates a random integer m, larger than $\Sigma a'$, and a random integer w, relatively prime to m, whose inverse $w^{-1}$ mod m will be used in decryption. The public cargo vector or enciphering key a is produced by multiplying each component of a' by w mod m $$a=wa' \bmod m.$$

Alice publishes a transposed version of a as her public key, but keeps the transposition, the simple cargo vector a', the multiplier w and its inverse, and the modulus m secret as her private key.

When Bob wants to send the message x to Alice he computes and sends $$S=a \cdot x.$$

Because $$\begin{aligned} S' &= w^{-1} S \bmod m \\ &= w^{-1} \Sigma a_i x_i \bmod m \\ &= w^{-1} \Sigma (wa'_i \bmod m) x_i \bmod m \\ &= \Sigma (w^{-1} wa'_i \bmod m) x_i \bmod m \\ &= \Sigma a'_i x_i \bmod m \\ &= a' \cdot x \end{aligned}$$

when $m > \Sigma a'$, Alice can use her secret information, $w^{-1}$ and m, to transform any message S that has been enciphered with her public key into $S'=w^{-1} \times S$ and solve the easy knapsack problem $S'=a' \cdot x$ to obtain x.

For example, for the secret vector a', above the values $w=2550$ and $m=8443$, result in the public vector $a=(5457, 4213, 5316, 6013, 7439)$, which hides the structure present in a'.

This process can be iterated to produce a sequence of cargo vectors with more and more difficult knapsack problems by using transformations $(w_1, m_1), (w_2, m_2)$, etc. The overall transformation that results is not, in general, equivalent to any single (w, m) transformation.

The trap-door knapsack system does not lend itself readily to the production of signatures because most elements S of the ciphertext space $\{0 \leq S \leq \Sigma a_i\}$, do not have inverse images. This does not interfere with the use of the system for sending private messages, but requires special adaptation for signature application [71], [98]. Merkle had great confidence in even the single iteration knapsack system and posted a note on his office offering a $100 reward to anyone who could break it.

IV. The RSA System

Unknown to us at the time we wrote "New Directions" were the three people who were to make the single most spectacular contribution to public-key cryptography: Ronald Rivest, Adi Shamir, and Leonard Adleman. Ron Rivest had been a graduate student in computer science at Stanford while I was working on proving the correctness of programs at the Stanford Artificial Intelligence Laboratory. One of my colleagues in that work was Zohar Manna, who shortly returned to Israel and supervised the doctoral research of Adi Shamir, at the Weitzman Institute. Len Adleman was a native San Franciscan with both undergraduate and graduate degrees from U.C. Berkeley. Despite this web of near connections, not one of the three had previously crossed our paths and their names were unfamiliar.

When the New Directions paper reached MIT in the fall of 1976, the three took up the challenge of producing a full-fledged public-key cryptosystem. The process lasted several months during which Rivest proposed approaches, Adleman attacked them, and Shamir recalls doing some of each.

In May 1977 they were rewarded with success. After investigating a number of possibilities, some of which were later put forward by other researchers [67], [1], they had discovered how a simple piece of classical number theory could be made to solve the problem. The resulting paper [91] also introduced Alice and Bob, the first couple of cryptography [53].

The RSA cryptosystem is a block cipher in which the plaintexts and ciphertexts are integers between 0 and $N-1$ for some N. It resembles the exponential key exchange system described above in using exponentiation in modular arithmetic for its enciphering and deciphering operations but, unlike that system, RSA must do its arithmetic not over prime numbers, but over composite ones.

Knowledge of plaintext M, a modulus N, and an exponent e are sufficient to allow calculation of $M^e$ mod N. Exponentiation, however, is a one-way function with respect to the extraction of roots as well as logarithms. Depending on the characteristics of N, M, and e, it may be very difficult to invert.

The RSA system makes use of the fact that finding large (e.g., 200 digit) prime numbers is computationally easy, but that factoring the product of two such numbers appears computationally infeasible. Alice creates her secret and public keys by selecting two very large prime numbers, P and Q, at random, and multiplying them together to obtain a bicomposite modulus N. She makes this product public together with a suitably chosen enciphering exponent e, but keeps the factors, P and Q secret.

The enciphering process of exponentiation modulo N can be carried out by anyone who knows N, but only Alice, who knows the factors of N, can reverse the process and decipher.

Using P and Q, Alice can compute the Euler totient function $\phi(N)$, which counts the number of integers between 1 and N that are relatively prime to N and consequently invertible in arithmetic modulo N. For a bicomposite number this is $$\phi(N)=(P-1)(Q-1).$$

The quantity $\phi(N)$ plays a critical role in Euler's theorem, which says that for any number x that is invertible modulo N (and for large N that is almost all of them)

$$(X^{\phi(N)} \equiv 1 \pmod{N})$$

or slightly more generally $$x^{k\phi(N)+1} \equiv x \pmod{N}.$$

Using $\phi(N)$ Alice can calculate [60] a number d such that $$e \times d \equiv x \pmod{\phi(N)}$$

which is equivalent to saying that $$e \times d = k \times \phi(N)+1.$$

When the cryptogram $M^e$ mod N is raised to the power d the result is $$(M^e)^d = M^{ed} = M^{k\phi(N)+1} \equiv M \pmod{N}$$

the original plaintext M.

As a very small example, suppose P=17 and Q=31 are chosen so that N=PQ=527 and $\phi(N)=(P-1)(Q-1)=480$. If e=7 is chosen then d=343. ($7 \times 343 = 2401 = 5 \times 480 + 1$). And if M=2 then $$C = M^e \bmod N = 2^7 \bmod 527 = 128.$$

Note again that only the public information (e, N) is required for enciphering M. To decipher, the private key d is needed to compute $$\begin{aligned} M &= C^d \bmod N \\ &= 128^{343} \bmod 527 \\ &= 128^{256} \times 128^{64} \times 128^{16} \times 128^4 \times 128^2 \times 128^1 \bmod 527 \\ &= 35 \times 256 \times 35 \times 101 \times 47 \times 128 \bmod 527 \\ &= 2 \bmod 527. \end{aligned}$$

Just as the strength of the exponential key exchange system is not known to be equivalent to the difficulty of extracting discrete logarithms, the strength of RSA has not been proven equivalent to factoring. There might be some method of taking the eth root of $M^e$ without calculating d and thus without providing information sufficient to factor. While at MIT in 1978, M. O. Rabin [86] produced a variant of RSA, subsequently improved by Hugh Williams of the University of Manitoba [113], that is equivalent to factoring. Rivest and I have independently observed [38], [92], however, that the precise equivalence Rabin has shown is a two-edged sword.

V. THE McELIECE CODING SCHEME

Within a short time yet another public-key system was to appear, this due to Robert J. McEliece of the Jet Propulsion Laboratory at Cal Tech [69]. McEliece's system makes use of the existence of a class of error correcting codes, the Goppa codes, for which a fast decoding algorithm is known. His idea was to construct a Goppa code and disguise it as a general linear code, whose decoding problem is NP-complete. There is a strong parallel here with the trapdoor knapsack system in which a superincreasing cargo vector, whose knapsack problem is simple to solve, is disguised as a general cargo vector whose knapsack problem is NP-complete.

In a knapsack system, the secret key consists of a superincreasing cargo vector v, together with the multiplier w and the modulus m that disguise it; in McEliece's system, the secret key consists of the generator matrix G for a Goppa code together with a nonsingular matrix S and a permutation matrix P that disguise it. The public key appears as the encoding matrix G'=SGP of a general linear code.

To encode a data block u into a message x, Alice multiplies it by Bob's public encoding matrix G' and adds a locally generated noise block Z.

To decode, Bob multiplies the received message x by $P^{-1}$, decodes $xp^{-1}$ to get a word in the Goppa code and multiplies this by $S^{-1}$ to recover Alice's data block.

McEliece's system has never achieved wide acceptance and has probably never even been considered for implementation in any real application. This may be because the public keys are quite large, requiring on the order of a million bits; it may be because the system entails substantial expansion of the data; or it may be because McEliece's system bears a frightening structural similarity to the knapsack systems whose fate we shall discover shortly.

VI. THE FALL OF THE KNAPSACKS

Nineteen eighty-two was the most exciting time for public-key cryptography since its spectacular first three years. In March, Adi Shamir sent out a research announcement: He had broken the single iteration Merkle-Hellman knapsack system [101], [102]. By applying new results of Lenstra at the Mathematische Centrum in Amsterdam, Shamir had learned how to take a public cargo vector and discover a w' and m' that would convert it back into a superincreasing "secret" cargo vector—not necessarily the same one the originator had used, but one that would suffice for decrypting messages encrypted with the public cargo vector.

Shamir's original attack was narrow. It seemed that perhaps its only consequence would be to strengthen the knapsack system by adding conditions to the construction rules for avoiding the new attack. The first response of Gustavus J. Simmons, whose work will dominate a later section, was that he could avoid Shamir's attack without even changing the cargo vector merely by a more careful choice of w and m [16]. He quickly learned, however, that Shamir's approach could be extended to break a far larger class of knapsack systems [16].

Crypto '82 revealed that several other people had continued down the trail Shamir had blazed. Shamir himself had reached the same conclusions. Andy Odlyzko and Jeff Lagarias at Bell Labs were on the same track and Len Adleman had not only devised an attack but programmed it on an Apple II. The substance of the attacks will not be treated here since it is central to another paper in this special section (E. F. Brickell and A. M. Odlyzko "Cryptanalysis: A Survey of Recent Results"). The events they engendered, however, will.

I had the pleasure of chairing the cryptanalysis session at Crypto '82 in which the various results were presented. Ironically, at the time I accepted the invitation to organize such a session, Shamir's announcement stood alone and knapsack systems were only one of the topics to be discussed. My original program ran into very bad luck. however. Of the papers initially scheduled only Donald Davies's talk on: "The Bombe at Bletchley Park." was actually presented. Nonetheless, the lost papers were more than replaced by presentations on various approaches to the knapsack problem.

Last on the program were Len Adleman and his computer, which had accepted a challenge on the first night of the conference. The hour passed; various techniques for attacking knapsack systems with different characteristics were heard; and the Apple II sat on the table waiting to reveal the results of its labors. At last Adleman rose to speak mumbling something self-deprecatingly about "the theory first, the public humiliation later" and beginning to explain his work. All the while the figure of Carl Nicolai moved silently in the background setting up the computer and copying a sequence of numbers from its screen onto a transparency. At last another transparency was drawn from a sealed envelope and the results placed side by side on the projector. They were identical. The public humiliation was not Adleman's, it was knapsack's.

Ralph Merkle was not present, but Marty Hellman, who was, gamely arose to make a concession speech on their behalf. Merkle, always one to put his money where his mouth was, had long since paid Shamir the $100 in prize money that he had placed on the table nearly six years before.

The press wrote that knapsacks were dead. I was skeptical but ventured that the results were sufficiently threatening that I felt "nobody should entrust anything of great value to a knapsack system unless he had a much deeper theory of their functioning than was currently available." Nor was Merkle's enthusiasm dampened. He promptly raised his bet and offered $1000 to anyone who could break a multiple iteration knapsack [72].

It took two years, but in the end, Merkle had to pay [42]. The money was finally claimed by Ernie Brickell in the summer of 1984 when he announced the destruction of a knapsack system of forty iterations and a hundred weights in the cargo vector in about an hour of Cray-1 time [17]. That Fall I was forced to admit: "knapsacks are flat on their back."

Closely related techniques have also been applied to make a dramatic reduction in the time needed to extract discrete logarithms in fields of type $GF(2^n)$. This approach was pioneered by Blake, Fuji-Hara, Vanstone, and Mullin in Canada [10] and refined by Coppersmith in the U.S. [28]. A comprehensive survey of this field was given by Andy Odlyzko at Eurocrypt '84 [79].

VII. EARLY RESPONSES TO PUBLIC KEY

A copy of the MIT report [90] on the RSA cryptosystem was sent to Martin Gardner, Mathematical Games editor of Scientific American, shortly after it was printed. Gardner promptly published a column [48] based on his reading of both the MIT report and "New Directions." Bearing the title: "A New Kind of Cryptosystem That Would Take Millions of Years to Break," it began a confusion that persists to this day between the two directions explored by the "New Directions" paper: public-key cryptography and the problem of proving the security of cryptographic systems. More significant, however, was the prestige that public-key cryptography got from being announced in the scientific world's most prominent lay journal more than six months before its appearance in the Communications of the ACM.

The excitement public-key cryptosystems provoked in the popular and scientific press was not matched by corresponding acceptance in the cryptographic establishment, however. In the same year that public-key cryptography was discovered, the National Bureau of Standards, with the support of the National Security Agency, proposed a conventional cryptographic system, designed by IBM, as a federal Data Encryption Standard [44]. Hellman and I criticized the proposal on the grounds that its key was too small [37], but manufacturers were gearing up to support the proposed standard and our criticism was seen by many as an attempt to disrupt the standards-making process to the advantage of our own work. Public key in its turn was attacked, in sales literature [74] and technical papers [76], [59] alike, more as though it were a competing product than a recent research discovery. This, however, did not deter NSA from claiming its share of the credit. Its director, in the words of the *Encyclopaedia Britannica* [110], "pointed out that two-key cryptography had been discovered at the agency a decade earlier," though no evidence for this claim was ever offered publicly.

Far from hurting public key, the attacks and counterclaims added to a ground swell of publicity that spread its reputation far faster than publication in scientific journals alone ever could. The criticism nonetheless bears careful examination, because the field has been affected as much by discoveries about how public key cryptosystems should be used as by discoveries about how they can be built.

In viewing public-key cryptography as a new form of cryptosystem rather than a new form of key management, I set the stage for criticism on grounds of both security and performance. Opponents were quick to point out that the RSA system ran about one thousandth as fast as DES and required keys about ten times as large. Although it had been obvious from the beginning that the use of public-key systems could be limited to exchanging keys for conventional cryptography, it was not immediately clear that this was necessary. In this context, the proposal to build hybrid systems [62] was hailed as a discovery in its own right.

At present, the convenient features of public-key cryptosystems are bought at the expense of speed. The fastest RSA implementations run at only a few thousand bits per second, while the fastest DES implementations run at many million. It is generally desirable, therefore, to make use of a hybrid in which the public-key systems are used only during key management processes to establish shared keys for employment with conventional systems.

No known theorem, however, says that a public-key cryptosystem must be larger and slower than a conventional one. The demonstrable restrictions mandate a larger minimum block size (though perhaps no larger than that of DES) and preclude use in stream modes whose chunks are smaller than this minimum. For a long time I felt that "high efficiency" public-key systems would be discovered and would supplant both current public key and conventional systems in most applications. Using public-key systems throughout, I argued, would yield a more uniform architecture with fewer components and would give the best possible damage limitation in the event of a key distribution center compromise [38]. Most important, I thought, if only one system were in use, only one certification study would be required. As certification is the most fundamental and most difficult problem in cryptography, this seemed to be where the real savings lay.

In time I saw the folly of this view. Theorems or not, it seemed silly to expect that adding a major new criterion to the requirements for a cryptographic system could fail to slow it down. The designer would always have more latitude with systems that did not have to satisfy the public key property and some of these would doubtless be faster. Even more compelling was the realization that modes of operation incompatible with the public-key property are essential in many communication channels.

To date, the "high-efficiency public-key systems" that I had hoped for have not appeared and the restriction of public-key cryptography to key management and signature applications is almost universally accepted. More fundamental criticism focuses on whether public-key actually makes any contribution to security, but, before examining this criticism, we must undertake a more careful study of key distribution mechanisms.

Key Management

The solution to the problem of key management using conventional cryptography is for the network to provide a key distribution center (KDC): a trusted network resource that shares a key with each subscriber and uses these in a bootstrap process to provide additional keys to the subscribers as needed. When one subscriber wants to communicate securely with another, he first contacts the KDC to obtain a session key for use in that particular conversation.

Key distribution protocols vary widely depending on the cost of messages, the availability of multiple simultaneous connections, whether the subscribers have synchronized clocks, and whether the KDC has authority not only to facilitate, but to allow or prohibit, communications. The following example is typical and makes use of an important property of cryptographic authentication. Because a message altered by anyone who does not have the correct key will fail when tested for authenticity, there is no loss of security in receiving a message from the hands of a potential opponent. In so doing, it introduces, in a conventional context, the concept of a certificate—a cryptographically authenticated message containing a cryptographic key-a concept that plays a vital role in modern key management.

1) When Alice wants to call Bob, she first calls the KDC and requests a key for communicating with Bob.
2) The KDC responds by sending Alice a pair of certificates. Each contains a copy of the required session key, one encrypted so that only Alice can read it and one so that only Bob can read it.
3) When Alice calls Bob, she presents the proper certificate as her introduction. Each of them decrypts the appropriate certificate under the key that he shares with the KDC and thereby gets access to the session key.
4) Alice and Bob can now communicate securely using the session key.

Alice and Bob need not go through all of this procedure on every call; they can instead save the certificates for later use. Such cacheing of keys allows subscribers to avoid calling the KDC every time they pick up the phone, but the number of KDC calls is still proportional to the number of distinct pairs of subscribers who want to communicate securely. A far more serious disadvantage of the arrangement described above is that the subscribers must share the secrecy of their keying information with the KDC and if it is penetrated, they too will be compromised.

A big improvement in both economy and security can be made by the use of public-key cryptography. A certificate functions as a letter of introduction. In the protocol above, Alice has obtained a letter that introduces her to Bob and Bob alone. In a network using public-key encryption, she can instead obtain a single certificate that introduces her to any network subscriber [62].

What accounts for the difference? In a conventional network, every subscriber shares a secret key with the KDC and can only authenticate messages explicitly meant for him. If one subscriber has the key needed to authenticate a message meant for another subscriber, he will also be able to create such a message and authentication fails. In a public-key network, each subscriber has the public key of the KDC and thus the capacity to authenticate any message from the KDC, but no power to forge one.

Alice and Bob, each having obtained a certificate from the KDC in advance of making any secure calls, communicate with each other as follows:

1) Alice sends her certificate to Bob.
2) Bob sends his certificate to Alice.
3) Alice and Bob each check the KDC's signature on the certificates they have received.
4) Alice and Bob can now communicate using the keys contained in the certificates.

When making a call, there is no need to call the KDC and little to be gained by cacheing the certificates. The added security arises from the fact that the KDC is not privy to any information that would enable it to spy on the subscribers. The keys that the KDC dispenses are public keys and messages encrypted with these can only be decrypted by using the corresponding secret keys, to which the KDC has no access.

The most carefully articulated attack came from Roger Needham and Michael Schroeder [76], who compared conventional key distribution protocols with similar public-key ones. They counted the numbers of messages required and concluded that conventional cryptography was more efficient than public-key cryptography. Unfortunately, in this analysis, they had ignored the fact that security was better under the public-key protocol they presented than the conventional one.

In order to compromise a network that employs conventional cryptography, it suffices to corrupt the KDC. This gives the intruders access to information sufficient for recovering the session keys used to encrypt past, present, and perhaps future messages. These keys, together with information obtained from passive wiretaps, allow the penetrators of the KDC access to the contents of any message sent on the system.

A public-key network presents the intruder with a much more difficult problem. Even if the KDC has been corrupted and its secret key is known to opponents, this information is insufficient to read the traffic recorded by a passive wiretap. The KDC's secret key is useful only for signing certificates containing subscribers' public keys: it does not enable the intruders to decrypt any subscriber traffic. To be able to gain access to this traffic, the intruders must use their ability to forge certificates as a way of tricking subscribers into encrypting messages with phony public keys.

In order to spy on a call from Alice to Bob, opponents who have discovered the secret key of the KDC must intercept the message in which Alice sends Bob the certificate for her public key and substitute one for a public key they have manufactured themselves and whose corresponding secret key is therefore known to them. This will enable them to decrypt any message that Alice sends to Bob. If such a misencrypted message actually reaches Bob, however, he will be unable to decrypt it and may alert Alice to the error. The opponents must therefore intercept Alice's messages, decrypt them, and reencrypt them in Bob's public key in order to maintain the deception. If the opponents want to understand Bob's replies to Alice, they must go through the same procedure with Bob, supplying him with a phony public key for Alice and translating all the messages he sends her.

The procedure above is cumbersome at best. Active wiretaps are in principle detectable, and the number the intruders must place in the net in order to maintain their control, grows rapidly with the number of subscribers being spied on. Over large portions of many networks—radio broadcast networks, for example—the message deletions essential to this scheme are extremely difficult. This forces the opponents to place their taps very close to the targets and recreates the circumstances of conventional wiretapping, thereby denying the opponents precisely those advantages of communications intelligence that make it so attractive.

It is worth observing that the use of a hybrid scheme diminishes the gain in security a little because the intruder does not need to control the channel after the session key has been selected. This threat, however, can be countered, without losing the advantages of a session key, by periodically (and unpredictably) using the public keys to exchange new session keys [40].

Public-key techniques also make it possible to conquer another troubling problem of conventional cryptographic security, the fact that compromised keys can be used to read traffic taken at an earlier date. At the trial of Jerry Whitworth, a spy who passed U.S. Navy keying information to the Russians, the judge asked the prosecution's expert witness [27]: "Why is it necessary to destroy yesterday's ... [key] ... list if it's never going to be used again?" The witness responded in shock: "A used key, Your Honor, is the most critical key there is. If anyone can gain access to that, they can read your communications."

The solution to this problem is to be found in a judicious combination of exponential key exchange and digital signatures, inherent in the operation of a secure telephone currently under development at Bell-Northern Research [41], [81] and intended for use on the Integrated Services Digital Network.

Each ISDN secure phone has an operating secret-key/public-key pair that has been negotiated with the network's key management facility. The public-key portion is embodied in a certificate signed by the key management facility along with such identifying information as its phone number and location. In the call setup process that follows, the phone uses this certificate to convey its public key to other phones.

1) The telephones perform an exponential key exchange to generate session keys unique to the current phone call. These keys are then used to encrypt all subsequent transmissions in a conventional cryptosystem.
2) Having established an encrypted (though not yet authenticated) channel, the phones begin exchanging credentials. Each sends the other its public-key certificate.
3) Each phone checks the signature on the certificate it has received and extracts from it the other phone's public key.
4) The phones now challenge each other to sign test messages and check the signatures on the responses using the public keys from the certificates.

Once the call setup is complete, each phone displays for its user the identity of the phone with which it is in communication.

The use of the exponential key exchange creates unique session keys that exist only inside the phones and only for the duration of the call. This provides a security guarantee whose absence in conventional cryptography is at the heart of many spy cases: once a call between uncompromised ISDN secure phones is completed and the session keys are destroyed, no compromise of the long term keys that still reside in the phones will enable anyone to decrypt the recording of the call. Using conventional key management techniques, session keys are always derivable from a combination of long-term keying material and intercepted traffic.

If long-term conventional keys are ever compromised, all communications, even those of earlier date, encrypted in derived keys, are compromised as well.

In the late 1970s, a code clerk named Christopher Boyce, who worked for a CIA-sponsored division of TRW, copied keying material that was supposed to have been destroyed and sold it to the Russians [66]. More recently, Jerry Whitworth did much the same thing in the communication center of the Alameda Naval Air Station [8]. The use of exponential key exchange would have rendered such previously used keys virtually worthless.

Another valuable ingredient of modern public-key technology is the message digest. Implementing a digital signature by encrypting the entire document to be signed with a secret key has two disadvantages. Because public key systems are slow, both the signature process (encrypting the message with a secret key), and the verification process (decrypting the message with a public key) are slow. There is also another difficulty. If the signature process encrypts the entire message, the recipient must retain the ciphertext for however long the signed message is needed. In order to make any use of it during this period, he must either save a plaintext copy as well or repeatedly decrypt the ciphertext.

The solution to this problem seems first to have been proposed by Donald Davies and Wyn Price of the National Physical Laboratory in Teddington, England. They proposed constructing a cryptographically compressed form or digest of the message [33] and signing by encrypting this with the secret key. In addition to its economies, this has the advantage of allowing the signature to be passed around independently of the message. This is often valuable in protocols in which a portion of the message that is required in the authentication process is not actually transmitted because it is already known to both parties.

Most criticism of public-key cryptography came about because public-key management has not always been seen from the clear, certificate oriented, view described above. When we first wrote about public key, we spoke either of users looking in a public directory to find each other's keys or simply of exchanging them in the course of communication. The essential fact that each user had to authenticate any public key he received was glossed over. Those with an investment in traditional cryptography were not slow to point out this oversight. Public-key cryptography was stigmatized as being weak on authentication and, although the problems the critics saw have long been solved, the criticism is heard to this day.

VIII. APPLICATION AND IMPLEMENTATION

While arguments about the true worth of public-key cryptography raged in the late 1970s, it came to the attention of one person who had no doubt: Gustavus J. Simmons, head of the mathematics department of Sandia National Laboratories. Simmons was responsible for the mathematical aspects of nuclear command and control and digital signatures were just what he needed. The applications were limitless: A nuclear weapon could demand a digitally signed order before it would arm itself; a badge admitting someone to a sensitive area could bear a digitally signed description of the person; a sensor monitoring compliance with a nuclear test ban treaty could place a digital signature on the information it reported. Sandia began immediately both to develop the technology of public-key devices [108], [107], [89] and to study the strength of the proposed systems [105], [16], [34].

The application about which Simmons spoke most frequently, test-ban monitoring by remote seismic observatories [106], is the subject of another paper in this special section (G. J. Simmons, "How to Insure that Data Acquired to Verify Treaty Compliance are Trustworthy"). If the United States and the Soviet Union could put seismometers on each other's territories and use these seismometers to monitor each other's nuclear tests, the rather generous hundred and fifty kiloton upper limit imposed on underground nuclear testing by the Limited Nuclear Test Ban Treaty of 1963 could be tightened considerably-perhaps to ten kilotons or even one kiloton. The problem is this: A monitoring nation must assure itself that the host nation is not concealing tests by tampering with the data from the monitor's observatories. Conventional cryptographic authentication techniques can solve this problem, but in the process create another. A host nation wants to assure itself that the monitoring nation can monitor only total yield and does not employ an instrument package capable of detecting staging or other aspects of the weapon not covered by the treaty. If the data from the remote seismic observatory are encrypted, the host country cannot tell what they contain.

Digital signatures provided a perfect solution. A digitally signed message from a remote seismic observatory cannot be altered by the host, but can be read. The host country can assure itself that the observatory is not exceeding its authority by comparing the data transmitted with data from a nearby observatory conforming to its own interpretation of the treaty language.

The RSA system was the one best suited to signature applications, so Sandia began building hardware to carry out the RSA calculations. In 1979 it announced a board implementation intended for the seismic monitoring application [106]. This was later followed by work on both low- and high-speed chips [89], [94].

Sandia was not the only hardware builder. Ron Rivest and colleagues at MIT, ostensibly theoretical computer scientists, learned to design hardware and produced a board at approximately the same time as Sandia. The MIT board would carry out an RSA encryption with a one hundred digit modulus in about a twentieth of a second. It was adequate "proof of concept" but too expensive for the commercial applications Rivest had in mind.

No sooner was the board done that Rivest started studying the recently popularized methods for designing large-scale integrated circuits. The result was an experimental nMOS chip that operated on approximately 500 bit numbers and should have been capable of about three encryptions per second [93]. This chip was originally intended as a prototype for commercial applications. As it happened, the chip was never gotten to work correctly, and the appearance of a commercially available RSA chip was to await the brilliant work of Cylink corporation in the mid-1980s [31].

As the present decade dawned, public-key technology began the transition from esoteric research to product development. Part of AT&T's response to a Carter Administration initiative to improve the overall security of American telecommunications, was to develop a specialized cryptographic device for protecting the Common Channel Interoffice Signaling (CCIS) on telephone trunks. The devices were link encryptors that used exponential key exchange to distribute DES keys [75], [16].

Although AT&T's system was widely used within its own huge network, it was never made available as a commercial product. At about the same time, however, Racal-Milgo began producing the Datacryptor II, a link encryption device that offered an RSA key exchange mode [87]. One device used exponential key exchange, the other RSA, but overall function was quite similar. When the public-key option of the Datacryptor is initialized, it manufactures a new RSA key pair and communicates the public portion to the Datacryptor at the other end of the line. The device that receives this public key manufactures a DES key and sends it to the first Datacryptor encrypted with RSA. Unfortunately, the opportunity for sophisticated digital signature based authentication that RSA makes possible was missed.

Future Secure Voice System

As the early 1980s became the mid-1980s, public-key cryptography finally achieved official, if nominally secret, acceptance. In 1983, NSA began feasibility studies for a new secure phone system. There was fewer than ten-thousand of their then latest system the Secure Telephone Unit II or STU-II and already the key distribution center for the principal network was overloaded, with users often complaining of busy signals. At $12,000 or more apiece, ten-thousand STU-IIs may have been all the government could afford, but it was hardly all the secure phones that were needed. In its desire to protect far more than just explicitly classified communications, NSA was dreaming of a million phones, each able to talk to any of the others. They could not have them all calling the key distribution center every day.

The system to be replaced employed electronic key distribution that allowed the STU-II to bootstrap itself into direct end-to-end encryption with a different key on every call. When a STU-II made a secure call to a terminal with which it did not share a key, it acquired one by calling a key distribution center using a protocol similar to one described earlier.

Although the STU-II seemed wonderful when first fielded in the late seventies, it had some major shortcomings. Some cacheing of keys was permitted, but calls to the KDC entailed significant overhead. Worse, each network had to be at a single clearance level, because there was no way for a STU-II to inform the user of the clearance level of the phone with which it was talking. These factors, as much as the high price and large size, conspired against the feasibility of building a really large STU-II network.

The STU-III is the size of a large conventional telephone and, at about $3000 apiece, substantially cheaper than its predecessor. It is equipped with a two-line display that, like the display of the ISDN secure phone, provides information to each party about the location, affiliation, and clearance of the other. This allows one phone to be used for the protection of information at various security levels. The phones are also sufficiently tamper resistant that unlike earlier equipment, the unkeyed instrument is unclassified. These elements will permit the new systems to be made much more widely available with projections of the number in use by the early 1990s running from half a million to three million [18], [43].

To make a secure call with a STU-III, the caller first places an ordinary call to another STU-III, then inserts a key-shaped device containing a cryptographic variable and pushes a "go secure" button. After an approximately fifteen second wait for cryptographic setup, each phone shows information about the identity and clearance of the other party on its display and the call can proceed.

In an unprecedented more, Walter Deeley, NSA's deputy director for communications security, announced the STU-III or Future Secure Voice System in an exclusive interview given to the New York Times [18]. The objective of the new system was primarily to provide secure voice and low-speed data communications for the U.S. Defense Department and its contractors. The interview did not say much about how it was going to work, but gradually the word began to leak out. The new system was using public key.

The new approach to key management was reported early on [88] and one article [6] spoke of phones being "reprogrammed once a year by secure telephone link," a turn of phrase strongly suggestive of a certificate passing protocol, similar to that described earlier, that minimizes the need for phones to talk to the key management center. Recent reports have been more forthcoming, speaking of a key management system called FIREFLY that, [95] "evolved from public key technology and is used to establish pair-wise traffic encryption keys." Both this description and testimony submitted to Congress by Lee Neuwirth of Cylink [78] suggest a combination of key exchange and certificates similar to that used in the ISDN secure phone and it is plausible that FIREFLY too is based on exponentiation.

Three companies: AT&T, Motorola, and RCA are manufacturing the instruments in interoperable versions, and GTE is building the key management system. So far, contracts have been issued for an initial 75,000 began in phones and deliveries began in November 1987.

Current Commercial Products

Several companies dedicated to developing public-key technology have been formed in the 1980s. All have been established by academic cryptographers endeavoring to exploit their discoveries commercially.

The first was RSA Data Security, founded by Rivest, Shamir, and Adleman, the inventors of the RSA cryptosystem, to exploit their patent on RSA and develop products based on the new technology. RSA produces a stand-alone software package called Mailsafe for encrypting and signing electronic mail. It also makes the primitives of this system available as a set of embeddable routines called Bsafe that has been licensed to major software manufacturers [9].

Cylink Corporation of Sunnyvale, Calif., has chalked up the most impressive engineering record in the public-key field. Its first product was the CIDEC HS [32], [63], a high-sped (1.544-Mbit) data encryptor for protecting DS1 telephone trunks. Like AT&T's CCIS encryptor, it uses exponential key exchange to establish DES session keys [77].

Cylink is also first to produce a commercially available RSA chip [7], [31]. The CY1024 is, despite its name, a 1028 bit exponential engine that can be cascaded to perform the calculations for RSA encryptions on moduli more than sixteen thousand bits long. A single CY1024 does a thousand bit encryption in under half a second-both modulus size and speed currently being sufficient for most applications.

The cryptography group at Waterloo University in Ontario have brought the fruits of their labors to market through a company called Cryptech. Their initial inroads into the problem of extracting logarithms over finite fields with 2" elements [10] made it necessary to employ larger fields. This in turn inspired them to develop high-speed exponentiation algorithms. The result is a system providing both exponential key exchange and half megabit data encryption with the same system [56].

IX. MULTIPLYING, FACTORING, AND FINDING PRIMES

The successes of the RSA system and of exponential key exchange over prime fields have led to significant development in three areas: multiplying, factoring, and finding prime numbers.

Factoring the modulus has remained the front runner among attacks on the RSA system. As factoring has improved, the modulus size required for security has more than doubled, requiring the system's users to hunt for larger and larger prime numbers in order to operate the system securely. As the numbers grow larger, faster and faster methods for doing modular arithmetic are required. The result has been not only the development of a technical base for public-key cryptography, but an inspiration and source of support for number theory [61], [65].

Factoring

In addressing the question of how large the primes in the RSA system should be, Rivest, Shamir, and Adleman's original memo spoke of a number d such that: "determining the prime factorization of a number n which is the product of just two prime numbers of length d (in digits) is 'computationally impossible'." When MIT/LCS/TM-82 first appeared, it contained the statement "Choosing d=40 seems to be satisfactory at present." In a second printing the recommended value of d was changed to 50 and in a third took a sharp leap to 100. This escalation is symbolic of the direction of factoring in the late 1970s and early 1980s.

In 1975, the factoring of a 39 digit number [73] constituted a landmark. The advent of the RSA system, however, was to usher in a decade of rapid progress in this field. By the end of that decade, numbers twice as long could be factored, if not with ease, at least with hours of Cray-1 time [34]. These factorizations confirmed, by actual computer implementation, the number theorists' predictions about factoring speed.

Several factoring techniques of comparable performance have become available in recent years [85]. All factor, in time, proportional to $$L(n) = e^{\sqrt{\ln n \ln \ln n}}$$

a figure that has already been seen in connection with discrete logarithms. The one that has been most widely applied is called quadratic sieve factoring [34] and lends itself well to machine implementation. One of factoring's gurus, Marvin Wunderlich, gave a paper in 1983 [116] that examined the way in which quadratic sieve factoring could exploit parallel processing to factor a hundred digit number in two months. In the same lecture, Wunderlich also explained the importance of uniformity in factoring methods applied in cryptanalysis. To be used in attacking RSA, a factoring method must be uniform, at least over the class of bicomposite numbers. If it is only applicable to numbers of some particular form, as many methods used by number theorists have been, the cryptographers will simply alter their key production to avoid numbers of that form.

More recently, Carl Pomerance [85] has undertaken the design of a modular machine employing custom chips and specialized to factoring. The size of the numbers you can factor is dependent on how much of such a machine you can afford. He has begun building a $25,000 implementation that he expects to factor 100 digit numbers in two weeks [96]. Ten million dollars worth of similar hardware would be able to factor hundred and fifty digit numbers in a year, but Pomerance's analysis does not stop there. Fixing one year as a nominal upper limit on our patience with factoring any one number, he is prepared to give a dollar estimate for factoring a number of any size. For a two hundred digit number, often considered unapproachable and a benchmark in judging RSA systems, the figure is one hundred billion dollars. This is a high price to be sure, but not beyond human grasp.

Prime Finding

Prime finding has followed a somewhat different course from factoring. This is in part because there are probabilistic techniques that identify primes with sufficient certainty to satisfy all but perhaps the pickiest of RSA users and in part because primality is not in itself a sufficient condition for numbers to be acceptable as RSA factors.

Fermat's Little Theorem guarantees that if n is prime then for all 0<b<n $$b^{n-1} \equiv 1 (\bmod n)$$

and any number that exhibits this property for some b is said to pass the pseudoprime test to base b. Composite numbers that pass pseudoprime tests to all bases exist, but they are rare and a number that passes several pseudoprime tests is probably a prime.

The test can be refined by making use of the fact that if n is an odd prime only the numbers 1 and −1 are square roots of 1, whereas if n is the product of distinct odd primes, the number of square roots of unity grows exponentially in the number of factors. If the number n passes the pseudoprime test to base b, it can be further examined to see if $$b^{\frac{n-1}{2}} \equiv 1 (\bmod n)$$

Tests of this kind are called strong pseudoprime tests to base b and very few composite numbers that pass strong pseudoprime tests to more than a few bases are known.

Although there has been extensive work in the past decade on giving genuine proofs of primality [84], [2], [51], the strong pseudoprime tests take care of the primality aspect of choosing the factors of RSA moduli. Another aspect arises from the fact that not all prime numbers are felt to be equally good. In many RSA implementations, the factors of the modulus are not random large primes p, but large primes chosen for particular properties of the factors of p-1 [91], [52].

High-Speed Arithmetic

Because of the progress in factoring during the decade of public-key's existence, the size of the numbers used in RSA has grown steadily. In the early years, talk of hundred digit moduli was common. One hundred digit numbers, 332 bits, did not seem likely to be factored in the immediate future and, with the available computing techniques, systems with bigger moduli ran very slowly. Today, hundred digit numbers seem only just out of reach and there is little discussion of moduli smaller than 512 bits. Two hundred digits, 664 bits, is frequently mentioned, and Cylink has not only chosen to make its chip a comfortable 1028 bits, but also to allow up to sixteen chips to be used in cascade. If this expansion has been pushed by advances in factoring, it has been made possible by advances in arithmetic.

Most of the computation done both in encryption and decryption and in the ancillary activity of manufacturing keys is exponentiation and each exponentiation, in turn, is made up of multiplications. Because, as discussed in the section of exponential key exchange, numbers can be raised to powers in a small number of operations by repeated squaring, it is the speed of the underlying multiplication operation that is crucial.

According to Rivest [94] multiplication on a fixed word length processor takes time proportional to the square length of the operands or $O(k^2)$. If dedicated serial/parallel hardware is constructed for the purpose, this time can be reduced to $O(k)$. In this case, the number of gates required is also proportional to the lengths of the operands, $O(k)$. The fastest implementations [15] run in time $O(\log k)$, but here the hardware requirements grow sharply to $O(k^2)$ gates.

X. DIRECTIONS IN PUBLIC-KEY RESEARCH

Public-key cryptography has followed a curious course. In its first three years, three systems were invented. One was broken; one has generally been considered impractical; and the third reigns alone as the irreplaceable basis for a new technology. Progress in producing new public-key cryptosystems is stymied as is the complementary problem of proving the one system we have secure, or even of proving it equivalent to factoring in a useful way.

Stymied though it may be in its central problems, however, the theoretical side of public-key cryptography is flourishing. This is perhaps because the public-key problem changed the flavor of cryptography. It may be difficult to produce good conventional cryptosystems, but the difficulty is all below the surface. It is typically easier to construct a transformation that appears to satisfy the requirements of security than it is to show that a proposed system is no good. The result is a long development cycle ill-suited to the give and take of academic research. Systems that even appear to exhibit the public-key property however, are difficult to find and this sort of difficulty is something the theoretical computer scientists can get their teeth into. The early taste of success that came with the development of RSA has inspired the search for solutions to other seemingly paradoxical problems and led to active exploration of a variety of new cryptographic disciplines.

This is not to say that contemporary research is not motivated by application. A constant caution in conventional cryptography is that the strength of a cryptosystem in one mode of operation does not guarantee its strength in another. It is widely felt, for example, that a conventional block cryptosystem such as DES is a suitable component with which to implement other modes of operation, but no proofs have been offered. This burdens anyone who chooses the system as a building block with a separate certificational examination of every configuration in which it is to be used. One objective of research in public-key cryptography has been to demonstrate the equivalence of many such secondary cryptographic problems to those that define the strength of the system. Substantial progress has been made in proving that the strength of cryptographic protocols is equivalent to the strength of the RSA system and that the protection provided by RSA is uniform [4].

There is another sort of applied flavor to even the purest of cryptographic research—a search for ways of transplanting our current social and business mechanisms to a world in which communication is primarily telecommunication. The digital signature was the first great success in this direction, which can be characterized as asking: What can we do with paper, pencil, coins, and handshakes that would be hard to do without them. And, how can we do it without them?

In 1977, I gave a talk on the problem of developing a purely electronic analog of the registered mail receipt, in the current topics session of the International Symposium on Information Theory at Cornell. My message was pessimistic, arguing for both the importance and the intractability of the problem, but fortunately my pessimism was premature. A year and a half later, the MIT group penned a note entitled "Mental Poker" [99]. It did not solve the problem of receipts for registered mail, but did show how to do something just as surprising: gamble over the telephone in a way that prevented either party from cheating without being discovered. This as it turned out was just the beginning.

To my delight, the problem of registered mail was rediscovered in Berkeley in 1982 as part of a larger category of problems that could be solved by ping-pong protocols and the emergence of this subject was one of the highlights of Crypto '82 [20]. Despite problems with protocols that were either broken or impossibly expensive [55], progress has been sufficient to provide hope that registered mail, contract signing, and related problems will one day have practical solutions.

In separate 1979 papers, G. R. Blakley at the University of Texas and Adi Shamir at MIT [11], [100] opened yet another direction of investigation: how secret information can be divided among several people in such a way that any k of them, but no fewer, can recover it. Although this field of secret sharing, unlike that of ping-pong protocols emerged full grown with probably correct and easily implementable protocols, it has been the subject of continuing examination [5], [26], [45], [5].

David Chaum, currently at the Center for Mathematics and Computer Science in Amsterdam, has applied public-key technology to a particularly challenging set of problems [21], [22]. In a society dominated by telecommunication and computers, organizations ranging from credit bureaus to government agencies can build up dossiers on private citizens by comparing notes on the credentials issued to the citizens. This dossier building occurs without the citizens' knowledge or consent and, at present, the only protection against abuses of this power lies in legal regulation. Chaum has developed technical ways of permitting an individual to control the transfer of information about him from one organization to another. Without action on the part of an individual to whom credentials have been issued, no organization is able to link the information it holds about the individual with information in the databanks of any other organization. Nonetheless, the systems guarantee that no individual can forge organizational credentials. Chaum's techniques address problems as diverse as preventing spies from tracing messages through electronic mail networks [19], [24] and protecting the privacy of participants in transactions with systems that recapture in electronic media both the assurance and the anonymity of cash [21].

The work drawing most attention at present is probably the field best known under the name of zero-knowledge proofs [49], [50], though similar theories, based on different assumptions about the capabilities of the participants, have been developed independently [23], [13], [14]. One of the idea's originators, Silvio Micali at MIT, described it as "the inverse of a digital signature." A zero-knowledge proof permits Alice to demonstrate to Bob that she knows something, but gives him no way of conveying this assurance to anybody else. In the original example, Alice convinced Bob that she knew how to color a map with three colors, but gave him no information whatever about what the coloring was.

The view that a zero-knowledge proof is the inverse of a digital signature now seems ironic, because a form of challenge and response authentication, applicable to the signature problem, has become the best known outgrowth of the field. In this system, the responder demonstrates to the challenger his knowledge of a secret number, without revealing any information about what the number is. Amos Fiat and Adi Shamir have recently brought forth an identification system of this sort, and announced a proof that breaking it is equivalent to factoring [47].

A purist might respond to all this by saying that having failed to solve the real problems in public-key cryptography, cryptographers have turned aside to find other things about which to write papers. It is a situation that has been seen before in mathematics. At the end of the last century, mathematical analysis ground to a halt against intractable problems in Fourier Theory, differential equations, and complex analysis. What many mathematicians did with their time while not solving the great problems was viewed with scorn by critics who spoke of the development of point set topology and abstract algebra as "soft mathematics." Only at mid-century did it become clear what had happened. In the abstractions a great hammer had been forged and through the 1950s and 1960s the classic problems began to fall under its blows. Perhaps cryptography will be equally lucky.

XI. WHERE IS PUBLIC KEY GOING?

In just over ten years, public-key cryptography has gone from a novel concept to a mainstay of cryptographic technology. It is soon to be implemented in hundreds of thousands of secure telephones and efforts are under way to apply the same mechanisms to data communications on a similar scale [97]. The outlook in the commercial world is equally bright. As early as the fourth quarter of this year, digital signatures may enter retail electronic funds transfer technology in a British experiment with point of sale terminals [57]. The demand for public key is exemplified by a recent conference on smart cards in Vienna, Austria [111], where one question was heard over and over again: When will we have an RSA card?

Now that it has achieved acceptance, public-key cryptography seems indispensable. In some ways, however, its technological base is disturbingly narrow. With the exception of the McEliece scheme and a cumbersome knapsack system devised explicitly to resist the known attacks [25], virtually all surviving public-key cryptosystems and most of the more numerous signature systems employ exponentiation over products of primes. They are thus vulnerable to breakthroughs in factoring or discrete logarithms. Key exchange systems are slightly better off since they can use the arithmetic of primes, prime products, or Galois fields with $2^n$ elements and are thus sensitive to progress on the discrete logarithm problem only.

From the standpoint of conventional cryptography, with its diversity of systems, the narrowness bespeaks a worrisome fragility. This worry, however, is mitigated by two factors.

The operations on which public-key cryptography currently depends—multiplying, exponentiating, and factoring—are all fundamental arithmetic phenomena. They have been the subject of intense mathematical scrutiny for centuries and the increased attention that has resulted from their use in public-key cryptosystems has on balance enhanced rather than diminished our confidence.

Our ability to carry out large arithmetic computations has grown steadily and now permits us to implement our systems with numbers sufficient in size to be vulnerable only to a dramatic breakthrough in factoring, logarithms, or root extraction.

It is even possible that RSA and exponential key exchange will be with us indefinitely. The fundamental nature of exponentiation makes both good candidates for eventual proof of security and if complexity theory evolves to provide convincing evidence of the strength of either, it will establish a new paradigm for judging cryptographic mechanisms. Even if new systems were faster and had smaller keys, the current systems might never be superseded altogether.

Such proofs have yet to be found, however, and proposed schemes are continually presented at the cryptographic conferences [12], [114], [80], [30], [82]. Approaches include generalizing RSA to other rings and various attempts to replace exponentials with polynomials, but in general they have not fared well and some of their fates are discussed elsewhere in this special section (E. F. Brickell and A. M. Odlyzko "Cryptanalysis: A Survey of Recent Results"). So far, the goal of improving on the performance of RSA without decreasing its security has yet to be achieved.

An appealing idea that has been put forward by Stephen Wolfram and studied by Papua Guam [54] is the use of cellular automata. Guam's system is too new to have received careful scrutiny and superficial examination suggests that it may suffer a weakness similar to one seen in other cases [46]. Even should this effort fail, however, the cellular automaton approach is attractive. Cellular automata differ from such widely accepted cryptographic mechanisms as shift registers in that, even if they are invertible, it is not possible to calculate the predecessor of an arbitrary state by simply reversing the rule for finding the successor. This makes them a viable vehicle for trap doors. Cellular automata also lend themselves to study of the randomness properties required of strong cryptographic systems [115].

What will be the outcome of such research? In an attempt to foresee the future of cryptography in 1979, I wrote [39]:

"Prospects for development of new and more efficient public key cryptographic systems by the latter part of the eighties are quite good. Public key cryptography is more successful today than algebraic coding theory was at the age of four. The major breakthroughs in that field did not begin till the latter part of its first decade, but then progressed rapidly. The similarity of the two fields is reason for optimism that . . . public key cryptography will follow a similar course.

Increasing use of the available public key systems in the 1980s will spread awareness of both their advantages and the performance shortcomings of the early examples. The research response to this awareness will probably produce better public key systems in time for use during the first half of the nineties."

My schedule was clearly too optimistic. If there are public-key cryptosystems with better performance or greater security waiting in the wings, they are proprietary systems that have yet to make even their existence known. Other aspects of the argument are closer to the mark, however. The use of public-key cryptosystems has increased dramatically and with it awareness of their advantages. Judicious use of hybrid systems and improved arithmetic algorithms have reduced the "performance shortcomings" to the status of a nuisance in most applications and the biggest motivation for seeking new systems today is probably the desire not to have all our eggs in one basket. Unless the available systems suffer a cryptanalytic disaster, moreover, the very success of public-key cryptography will delay the introduction of new ones until the equipment now going into the field becomes outmoded for other reasons.

For a discipline just entering its teens, the position of public-key cryptography should be seen not as a fragile, but as a strong one.

REFERENCES

[1] L. M. Adleman and R. L. Rivest, "How to break the Lu-Lee (COMSAT) public key cryptosystem," MIT Laboratory for Computer Science, Jul. 24, 1979.

[2] L. M. Adleman, C. Pomerance, and R. S. Rumley, "On distinguishing prime numbers from composite numbers," *Ann. Math.*, vol. 117, no. 2, pp. 173–206, 1983.

[3] A. V. Aho, J. E. Hopcroft, and J. D. Ullman, *The Design and Analysis of Computer Algorithms*. Reading, Mass.: Addison-Wesley, 1974.

[4] W. Alexi, B. Chor, O. Goldreich, and C. P. Schnor, "RSA/Rabin bits are ½+1/(poly(log N)) secure," in 25th *Annual IEEE Symp. on Foundations of Comp. Sci.*, pp. 449–457, 1984.

[5] C. Asmuth and J. Blum, "A modular approach to key safeguarding," *IEEE Trans. Informat. Theory*, vol. IT-29, pp. 208–210, March 1983.

[6] "Contractors ready low-cost, secure telephone for 1987 service start," *Aviat. Week Space Technol., pp.* 114–115, January 1986.

[7] C. Barney, "Cypher chip makes key distribution a snap," *Electronics*, Aug. 7, 1986.

[8] J. Barron, *Breaking the Ring*. Boston, Mass.: Houghton Mifflin, 1987.

[9] D. ben-Aaron, "Mailsafe signs, seals, and delivers files," *Information Week*, pp. 19–22, Sep. 15, 1986.

[10] I. F. Blake, R. Fuji-Hara, R. C. Mullin, and S. A. Vanstone, "Computing logarithms in finite fields of characteristic two," *SIAM J. Alg. Disc. Methods*, vol. 5, no. 2, pp. 276–285, June 1984.

[11] G. R. Blakley, "Safeguarding cryptographic keys," in *National Computer Conf.*, pp. 313–317, 1979.

[12] G. R. Blakley and D. Chaum, Eds., *Advances in Cryptology: Proceedings of Crypto '84*, Berlin, Germany: Springer-Verlag, 1985.

[13] G. Brassard and C. Crépeau, "Non-transitive transfer of confidence: A perfect zero-knowledge interactive protocol for SAT and beyond," in 27th *Annual IEEE Symp. on the Foundations of Comp. Sci.*, pp. 188–195, 1986.

[14] G. Brassard, C. Crépeau, and D. Chaum, "Minimum disclosure proofs of disclosure proofs of knowledge," Center for Mathematics and Computer Science, Amsterdam, Rep. PM-R8710, December 1987. (To appear as an invited paper in *J. Comput. Syst. Sci.*)

[15] E. F. Brickell, "A fast modular multiplication algorithm with application to two key cryptography," in *Crypto '82* [20], pp. 51–60.

[16] E. F. Brickell and G. J. Simmons, "A status report on knapsack based public key cryptosystems," *Congressus Numerantium*, vol. 7, pp. 3–72, 1983. The CCIS encryptor is mentioned on pp. 4–5.

[17] E. F. Brickell, "Breaking iterated knapsacks," in *Crypto '84* [12], pp. 342–358.

[18] D. Burnham, "NSA seeking 500,000 'secure' telephones," *The New York Times*, Oct. 7, 1984.

[19] D. L. Chaum, "Untraceable electronic mail, return addresses, and digital pseudonyms," *CACM*, vol. 24, no. 2, pp. 84–88, February 1981.

[20] D. Chaum, R. L. Rivest, and A. T. Sherman, Eds., *Advances in Cryptology, Proceedings of Crypto '82*. New York, N.Y.: Plenum, 1983.

[21] D. Chaum, "Security without identification: Transaction systems to make big brother obsolete," *CACM*, vol. 28, no. 10, pp. 1030–1044, October 1985.

[22] D. Chaum and J. H. Evertse, "A secure and privacy-protecting protocol for transmitting personal information between organizations," in *Crypto '86* [80], pp. 118–167.

[23] D. Chaum, "Demonstrating that a public predicate can be satisfied without revealing any information about how," in *Crypto '86* [80], pp. 195–199.

[24] ———, "The dining cryptographers problem: Unconditional sender untraceability," *J. Cryptology*, vol. 1, no. 1, pp. 65–75, 1988.

[25] B. Chor and R. L. Rivest, "A knapsack type public-key cryptosystem based on arithmetic in finite fields," in *Crypto '84* [12], pp. 54–65.

[26] B. Chor, S. Goldwasser, S. Micali, and B. Awerbuch, "Verifiable secret sharing and achieving simultaneity in the presence of faults," in 26th *Annual IEEE Symp. on the Foundations of Comp. Sci.*, pp. 383–395, 1985.

[27] Testimony of David Earl Clark at the trial of Jerry Alfred Whitworth before Judge J. P. Vukasin, Jr., in the U.S. District Court, Northern District of California, Mar. 25, 1986. Reported by V. Pella Balboni, pp. 111–1345.

[28] D. Coppersmith, "Fast evaluation of logarithms in fields of characteristic two," *IEEE Trans. Informat. Theory*, vol. IT-30, pp. 587–594, 1984.

[29] D. Coppersmith, A. M. Odlyzko, and R. Schroeppel, "Discrete logarithms in GF(p)," *Algorithmica*, vol 1, , pp. 1–16, 1986.

[30] N. Cot and I. Ingemarsson, Eds., *Advances in Cryptology, Proceedings of EUROCRYPT '84*. Berlin, Germany: Springer-Verlag, 1985.

[31] "Cidec-HS high speed DES encryption for digital networks," product description, Cylink Corporation, Sunnyvale, Calif.

[32] "Key management development package," product description, Cylink Corporation, Sunnyvale, Calif.

[33] D. W. Davies and W. L. Price, "The applications of digital signatures based on public key cryptosystems," National Physical Laboratory Rep. DNACS 39/80, December 1980.

[34] J. A. Davis, D. B. Holdridge, and G. J. Simmons, "Status report on factoring (at the Sandia National Laboratories)," in *Euro-crypt '84*[30], pp. 183–215.

[35] W. Diffie and M. E. Hellman, "Multiuser cryptographic techniques," in *Proc. Nat. Computer Conf.*, (New York, N.Y.), pp. 109–112, Jun. 7–10, 1976.

[36] ——, "New directions in cryptography," *IEEE Trans Informat. Theory*, vol. IT-22, pp. 644–654, November 1976.

[37] ——, "Exhaustive cryptanalysis of the NBS data encryption standard," *Computer*, vol. 10, no. 6, pp. 74–84, June 1977.

[38] W. Diffie, "Conventional versus public key cryptosystems," in [109], pp. 41–72. Rabin's system is discussed on p. 70, the relative strength of conventional and public-key distribution on pp. 64–66.

[39] ——, "Cryptographic technology: Fifteen-year forecast," in [109], pp. 301–327.

[40] ——, "Securing the DoD transmission control protocol," in Crypto '85 [114], pp. 108–127.

[41] W. Diffie, L. Strawczynski, B. O'Higgins, and D. Steer, "An ISDN secure telephone unit," in *Proc. National Communications Forum 1987*, pp. 473–477.

[42] E. Dolnick, "N. M. scientist cracks code, wins $1000," *The Boston Globe*, Nov. 6, 1984.

[43] Electronic Industries Association, "Comsec and Compusec market study," Jan. 14, 1987.

[44] Federal Register, "Encryption algorithm for computer data protection," vol. 40, no. 52, pp. 12134–12139, Mar. 17, 1975.

[45] P. Feldman, "A practical scheme for non-interactive verifiable secret sharing," in 28th *Annual IEEE Symp. on the Foundations of Comp. Sci.*, pp. 427–437, 1987.

[46] H. Fell and W. Diffie, "Analysis of a public key approach based on polynomial substitution," in Crypto '85[114]. pp.108–127.

[47] A. Fiat and A. Shamir, "How to prove yourself: Practical solutions to identification and signature problems," in *Crypto '86*[80], pp. 186–212.

[48] M. Gardner, "A new kind of cipher that would take millions of years to break," *Sci. Amer.*, pp. 120–124 (Mathematical Games), August 1977.

[49] O. Goldreich, S. Micali, and A. Wigderson, "Proofs that yield nothing but their validity and a methodology of cryptographic protocol design," in 27th *Annual IEEE Conf. on the Foundations of Comp. Sci.*, pp. 174–187, 1986.

[50] S. Goldwasser, S. Micali, and C. Rackoff, "Knowledge complexity of interactive proofs," in 17th *Symp. on the Theory of Computing*, pp. 291–304, 1985.

[51] S. Goldwasser and J. Killian, "All primes can be quickly certified," in 18th *Symp. on the Theory of Computing*, pp. 316–329, 1986.

[52] J. Gordon, "Strong primes are easy to find," in *Eurocrypt '84*[30], pp. 215–223.

[53] ——, speech at the Zurich Seminar, 1984. In this lecture, which has unfortunately never been published, Gordon assembled the facts of Alice and Bob's precarious lives, which had previously been available only as scattered references in the literature.

[54] P. Guam, "Cellular automaton public key cryptosystem," *Complex Systems*, vol. 1, pp. 51–56, 1987.

[55] J. Hastad and A. Shamir, "The cryptographic security of truncated linearly related variables," in 17th *Symp. on Theory of Computing*, pp. 356–362, 385.

[56] D. Helwig, "Coding chip devised in Waterloo," *The Globe and Mail*, Jan. 1, 1987.

[57] "National EFT POS to use public key cryptography," *Information Security Monitor*, vol. 2, no. 12, p. 1, November 1987.

[58] M. Ito, A. Saito, and T. Nishizeki, "Secret sharing scheme realizing general access structure," in *Globecom '87*, pp. 361–364, 1987.

[59] C. S. Kline and G. J. Popek, "Public key vs. conventional key encryption," in *National Computer Conf.*, 1979.

[60] D. Knuth, "Semi-numerical algorithms," in *The Art of Computer Programming*, vol. 2, 2nd ed. Reading, Mass.: Addison-Wesley, 1981, pp. 316–336.

[61] N. Koblitz, *A Course in Number Theory and Cryptography*. New York, N.Y.: Springer-Verlag, 1987.

[62] L. M. Kohnfelder, "Toward a practical public key cryptosystem," Bachelors Thesis, MIT Dept. of Electrical Engineering, May 1978.

[63] R. Kopeck, "T1 encryption plan protects data," *PC Week*, Mar. 3, 1987.

[64] J. Kowalchuk, B. P. Schanning, and S. Powers, "Communication privacy: Integration of public and secret key cryptography," in *National Telecommunications Conf.*, (Houston, Tex.), pp. 49.1.1–5, Nov. 30–Dec. 4, 1980.

[65] E. Kranakis, *Primality and Cryptography*. New York, N.Y.: Wiley, 1986.

[66] R. Lindsey, *The Falcon and the Snowman*. New York, N.Y.: Simon and Schuster, 1979.

[67] S. Lu and L. Lee, "A simple and effective public key cryptosystem," *Comsat Technical Rev.*, vol. 9, no. 1, Spring 1979.

[68] K. S. McCurley, "A key distribution system equivalent to factoring," Department of Mathematics, University of Southern California, Jun. 3, 1987.

[69] R. J. McEliece, "A public key cryptosystem based on algebraic coding theory," JPL DSN Progress Rep. 42–44, pp. 114–116, January–February 1978.

[70] R. Merkle, "Secure communication over insecure channels," CACM, pp. 294–299, April 1978.

[71] R.C. Merkle and M. E. Hellman, "Hiding information and signatures in trap door knapsacks, " *IEEE Trans. Informat. Theory*, vol. IT-24, pp. 525–30, September 1978.

[72] R. Merkle, Letters to the Editor, *Time Magazine*, vol. 120, no. 20, p. 8, Nov. 15, 1982.

[73] M. A. Morrison and J. Brillhart, "A method of factoring and the factorization of $F_7$," *Math. Comp.*, vol. 29, pp. 18–205, 1975.

[74] "Advanced techniques in network security," Motorola Government Electronics Division, Scottsdale, Ariz., about 1977.

[75] F. H. Myers, "A data link encryption system," in *National Telecommunications Conf.*, (Washington, D.C.), pp. 4.5.1–4.5.8, Nov. 27–29, 1979.

[76] R. M. Needham and M. D. Schroeder, "Using encryption for authentication in large networks of computers," CACM, vol. 21, pp. 993–999, December 1978.

[77] L. Neuwirth, "A comparison of four key distribution methods," Telecommunications, pp. 110–111, 114–115, July 1986.

[78] "Statement of Lee Neuwirth of Cylink on HR145," submitted to Congressional committees considering HR145, February 1987.

[79] A. M. Odlyzko, "Discrete logarithms in finite fields and their cryptographic significance," in Eurocrypt '84[30], pp. 225–314.

[80] -----, Ed., Advances In Cryptology-CRYPTO '86. Berlin, Germany: Springer-Verlag, 1987.

[81] B. O'Higgins, W. Diffie, L. Strawczynski, and R. de Hoog, "Encryption and ISDN-A natural fit," in International Switching Symp., (Phoenix, Ariz.), pp. A11.4.1–7, Mar. 16–20, 1987.

[82] F. Pichler, Ed., Advances in Cryptology-Proceedings of EUROCRYPT '85. Berlin, Germany: Springer-Verlag, 1986.

[83] S. C. Pohlig and M. E. Hellman, "An improved algorithm for computing logarithms in GF(p) and its cryptographic significance," IEEE Trans. Informat. Theory, vol. IT-24, pp. 106–110, January 1978.

[84] C. Pomerance, "Recent developments in primality testing," The Mathematical Intelligence, vol. 3, no. 3, pp. 97–105, 1981.

[85] C. Pomerance, J. W. Smith, and R. Tuler, "A pipe-line architecture for manufacturing large integers with the quadratic sieve algorithm," to appear in a special issue on cryptography of the SIAM J. Computing.

[86] M. O. Rabin, "Digitalized signatures and public-key functions as intractable as factorization," MIT Laboratory for Computer Science, MIT/LCS/TR-212, January 1979.

[87] "Datacryptor II, public key management option," Racal-Milgo, Sunrise Fla., 1981.

[88] "AT&T readying new spy-proof phone for big military and civilian markets," The Report on AT&T, pp. 6–7, Jun. 2, 1986.

[89] R. F. Rieden, J. B. Snyder, R. J. Widman, and W. J. Barnard, "A two-chip implementation of the RSA public-key encryption algorithm," in GOMAC (Government Microcircuit Applications Conference), (Orlando, Fla.), pp. 24–27, November 1982.

[90] R. L. Rivest, A. Shamir, and L. Adleman, "On digital signatures and public key cryptosystems," MIT Laboratory for Computer Science, MIT/LCS/TR-212, January 1979.

[91] -----, "A method for obtaining digital signatures and public key cryptosystems," CACM, vol. 21, no. 2, pp. 120–126, February 1978.

[92] R. Rivest, personal communication with H. C. Williams cited on p. 729 in [113].

[93] -----, "A description of a single-chip implementation of the RSA cipher," Lambda, vol 1, no. 3, pp. 14–18, Fall 1980.

[94] -----, "RSA chips (past/present/future)," in Eurocrypt '84[30], pp. 159–165.

[95] H. L. Rogers, "An overview of the caneware program," paper 31, presented at the 3rd Annual Symp. on Physical/ Electronic Security, Armed Forces Communications and Electronics Association, Philadelphia Chapter, August 1987.

[96] "Toward a new factoring record," Science News, p. 62, Jan. 23, 1987.

[97] "SDNS: A network on implementation," in 10th National Computer Security Conf., (Baltimore, Md.), pp. 150–174, Sept. 21–24,1987. Session containing six papers on the Secure Data Network System.

[98] A. Shamir, "A fast signature scheme," M.I.T. Laboratory for Computer Science, Technical Memorandum, MIT/LCS/TM-107, July 1978.

[99] A. Shamir, R. L. Rivest, and L. M. Adleman, "Mental poker," MIT Laboratory for Computer Science, Technical Memorandum, MIT/LCS/TM-125, Jan. 29, 1979.

[100] A. Shamir, "How to share a secret," CACM, vol. 22, no. 11, pp. 612–613, November 1979.

[101] -----, "A polynomial time algorithm for breaking Merkle-Hellman cryptosystems (extended abstract)," Research announcement, preliminary draft, Applied Mathematics, Weizmann Institute, Rehovot, Israel, Apr. 20, 1982. This paper appeared with a slightly different title: "A polynomial time algorithm for breaking the basic Merkle-Hellman cryptosystem (extended abstract)," in Crypto '82 [20], pp. 279–288.

[102] -----, "A polynomial time algorithm for breaking the basic Merkle-Hellman cryptosystem," IEEE Trans. Informat. Theory, vol. IT-30, no. 5, pp. 699–704, September 1984.

[103] Z. Shmuely, "Composite Diffie-Hellman public-key generating systems are hard to break," Computer Science Department, Technion, Haifa, Israel, Technical Rep. 356, February 1985.

[104] R. Silver, "The computation of indices modulo P," Mitre Corporation, Working Paper WP-07062, p. 3, May 7, 1964.

[105] G. J. Simmons and M. J. Norris, "Preliminary comments on the M.I.T. public key cryptosystem," Cryptologia, vol. 1, pp. 406–414, October 1977.

[106] G. J. Simmons, "Authentication without secrecy: A secure communications problem uniquely solvable by asymmetric encryption techniques," in IEEE EASCON '79 (Washington, DC), pp. 661–662, Oct. 9–11, 1979.

[107] G. J. Simmons and M. J. Norris, "How to cipher faster using redundant number systems," Sandia National Laboratories, SAND-80-1886, August 1980.

[108] G. J. Simmons, "High speed arithmetic utilizing redundant number systems," in National Telecommunications Conf., (Houston, Tex.), pp. 49.3.1–2, Nov. 30–Dec. 4, 1980.

[109] -----, Ed., Secure Communications and Asymmetric Cryptosystems. AAAS Selected Symposium 69. Boulder, CO: Westview Press, 1982.

[110] __, "Cryptology" in Encyclopaedia Britannica, 16th Edition. Chicago, Ill.: Encyclopaedia Britannica, 1986, pp. 913–924B.

[111] Proceedings of Smart Card 2000, Vienna, Austria, Oct. 19–20, 1988.

[112] M. V. Wilkes, Time-Sharing Computer Systems. New York, N.Y.: American Elsevier, 1972.

[113] H. C. Williams, "A modification of the RSA public-key cryptosystem," IEEE Trans. Informat. Theory, vol. IT-26, no. 6, pp. 726–729, November 1980.

[114] __, Eds., Advances in Cryptology-CRYPTO '85. Berlin, Germany; Springer-Verlag, 1986.

[115] S. Wolfram, "Cryptography with cellular automata," in Crypto '85 [114], pp. 429–432.

[116] M. C. Wunderlich, "Recent advances in the design and implementation of large integer factorization algorithms," in 1983 Symp. on Security and Privacy, (Oakland, Calif.), pp. 67–71, Apr. 25–27, 1983.

[119] K. Yiu and K. Peterson, "A single-chip VLSI implementation of the discrete exponential public key distribution system," in GOMAC (Government Microcircuit Applications Conference), (Orlando, Fla.), pp. 18–23, November 1982.

Whitfield Diffie was born in Washington, DC, on Jun. 5, 1944. He received the B.S. degree in mathematics from the Massachusetts Institute of Technology, Cambridge, Mass., in 1965.

While at Mitre Corporation from 1965 to 1969, he worked with Carl Engelman in developing the Mathlab symbolic mathematical manipulation system, later expanded at MIT to become Macsyma. In 1969, he transferred to the Stanford University Artificial Intelligence Laboratory to work with John McCarthy on proof checking and proof of correctness of programs. While there he also developed the compiler adopted for the U.C. Irvine Ilisp system. In 1973, Diffie took leave from Stanford and began his work on cryptography while traveling around the U.S. He continued this work as a graduate student under Martin Hellman at Stanford University from 1975 through 1978. Since 1978, Diffie has been the Manager of Secure Systems Research for Bell-Northern Research, Mountain View, Calif. His most recent work has been on key management protocols for telephones designed to operate on the developing Integrated Services Digital Network.

Manuscript received Jan. 19, 1988; revised Mar. 25, 1988. The author is with Bell-Northern Research, Mountain View, Calif. 94039, USA.

IEEE Log Number 8821645.

0018–9219/88/0500–0560$01.00 (c) 1988 IEEE.

APPENDIX B

Designs, Codes and Cryptography, 2, 107–125 (1992)

© 1992 Kluwer Academic Publishers

Manufactured in the Netherlands

AUTHENTICATION AND AUTHENTICATED KEY EXCHANGES

WHITFIELD DIFFIE*

Sun Microsystems, 2550 Garcia Avenue., Mountain View, Calif. 94043

PAUL C. VAN OORSCHOT AND MICHAEL J. WIENER

Bell-Northern Research, P.O. Box 3511 Station C, Ottawa, Ontario K1Y 4H7 Canada

Communicated by S. A. Vanstone

Received Nov. 22, 1991. Revised Mar. 6, 1992.

Abstract. We discuss two-party mutual authentication protocols providing authenticated key exchange, focusing on those using asymmetric techniques. A simple, efficient protocol referred to as the station-to-station (STS) protocol is introduced, examined in detail, and considered in relation to existing protocols. The definition of a secure protocol is considered, and desirable characteristics of secure protocols are discussed.

1. Introduction

The goal of an authentication protocol is to provide the communicating parties with some assurance that they know each other's true identities. In an authenticated key exchange, there is the additional goal that the two parties end up sharing a common key known only to them. This secret key can then be used for some time thereafter to provide privacy, data integrity, or both. In this paper, we discuss the security of public-key based authentication protocols, with and without an associated key exchange. We restrict our attention to two-party mutual authentication, rather than multi-party and one-way authentication protocols. We assume that individual underlying cryptographic mechanisms are not vulnerable, and restrict our attention to attacks on protocols themselves. An enemy (attacker, intruder, adversary) can see all exchanged messages, can delete, alter, inject, and redirect messages, can initiate communications with another party, and can reuse messages from past communications.

Much work has been done in recent years involving identification and authentication schemes using asymmetric techniques. Identity-based schemes, as introduced by Shamir [29], rely on the existence of a trusted central authority, that holds secret information from which other secrets are generated and distributed to individual users when those users join the system. Günther [15] has proposed an identity-based protocol providing authenticated key establishment, making use of the ideas of Diffie-Hellman key exchange [9] and the ElGamal signature scheme [11]. The authentication is indirect and does not offer perfect forward secrecy (see Section 4), although the latter can be provided at the cost of incorporating an extra exchange of Diffie-Hellman exponentials. Okamoto and Tanaka [22] have proposed an identity-based authenticated key establishment protocol based on exponential key exchange and RSA. They offer versions which provide both indirect and direct authentication, although the latter as presented, employs timestamps (Section 4), and some of the fields in the exchange may be unnecessary or redundant. Interactive identification protocols which provide proof of identity and make use of ideas involving zero-knowledge have been proposed by Fiat and Shamir [12], and more efficient protocols have been subsequently proposed by Guillou and Quisquater [14] and Schnorr [28], among others. These identification protocols differ from authenticated key exchanges in that the former do not provide keys for use in subsequent communications (e.g., for data integrity or data confidentiality).

As has been pointed out by many others, [5], [7], [13], [19], [20], the design of cryptographic protocols in general, and authentication protocols in particular, is extremely error prone. The literature is filled with protocols that have been found to contain security flaws ranging from minor to fatal in severity. Furthermore, aside from security issues, it is a concern in practice that many of the published protocols contain redundancies or are inefficient with respect to the number of communications required, the number of cryptographic operations required (implying high computational demands), or the number and types of fields required in the communicated messages. This motivates the search for authentication protocols that are simple, require a minimum number of communications, a small number of fields in each message or token, and a small number of cryptographic operations. These considerations motivate the present work on public-key based protocols. Similar considerations motivated Bird et al. [5] in their work on symmetric authentication protocols, which helped focus our attention on the idea of matching protocol runs (see Section 3). Our work extends the definition of a secure protocol to public-key based protocols with optional key exchange.

We are concerned with both authentication and key exchange. It is now well accepted that these topics should be considered jointly rather than separately [2]. A protocol providing authentication without key exchange is susceptible to an enemy who waits until authentication is complete and then takes over one end of the communications line. Such an attack is not precluded by a key exchange that is independent of authentication. Key exchange should be linked to authentication so that a party has assurances that an exchanged key (which might be used to facilitate privacy or integrity and thus keep authenticity alive) is in fact shared with the authenticated party, and not an imposter. For these reasons, it is essential to keep key exchange in mind in the design and analysis of authentication protocols.

In the remainder of this paper, we first provide some background regarding attacks on protocols, in an effort to motivate and give context to what follows. We then proceed with a definition of a secure protocol, and discuss characteristics that we consider desirable in an authentication protocol. We introduce a protocol referred to as the station-to-station protocol, examine it in detail, and justify its features. Some related protocols are discussed, and the proposed protocol is considered in relation to these. We conclude with a summary of principles we feel are important in the design of authentication protocols.

2. Notation and Motivation

Before discussing protocols in more detail, we first define some notation. For historical reasons, we give the two parties involved the names Alice and Bob.

{ } Braces indicate a hash function. {x, y} is the result when a hash function is applied to x concatenated with y.

$s_A$ Alice's secret key for a signature scheme. $s_A(x)$ is Alice's signature on x. $s_A\{x\}$ is Alice's signature on the hashed version of x.

$p_A$ Alice's public key for a signature scheme. If the signature scheme is a public-key cryptosystem, then we define $p_A\{x\}$ and $p_A(x)$ to be Alice's public key encryption function with and without hashing.

$Cert_A$ Alice's certificate, containing Alice's name (and possibly other information), her public key, and a trusted authority T's signature over this information. $Cert_A$=(Alice, $p_A, \ldots, s_T\{Alice, p_A, \ldots\}$). $Cert_A$ binds the name Alice to the public key $p_A$. If Alice sends her certificate to Bob and provides evidence that she knows the secret key $s_A$ corresponding to $p_A$, then she has provided evidence to Bob that she is in fact Alice.

$E_k(\cdot)$ Encryption using a symmetric cryptosystem with key K.

To illustrate an attack on a protocol and motivate what follows, consider the following simple (but flawed) challenge-response protocol where Alice and Bob sign each other's random number challenges.

Insecure simple challenge-response

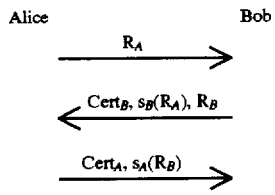

Alice begins by sending the random challenge $R_A$ to Bob. Bob responds with his certificate, his signature on $R_A$ and a random challenge $R_B$. Alice uses Bob's public key in $Cert_B$ to verify Bob's signature, and then responds with her certificate and signature on $R_B$. Finally, Bob verifies Alice's signature.

An enemy Eve can impersonate Alice in a communication with Bob by passing Bob's challenge along to Alice:

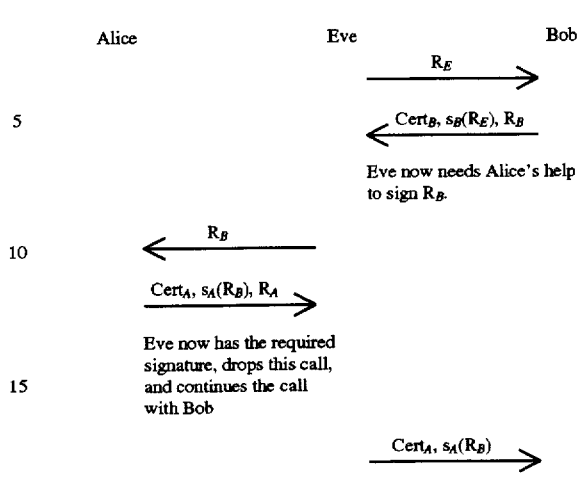

Eve begins by initiating the protocol with Bob. When Bob sends the challenge to Eve, Eve initiates another instance of the protocol with Alice and gets Alice to sign Bob's challenge. Eve can then complete the authentication with Bob and successfully impersonate Alice. The main problem here is that the challenged party has no influence over what he will sign. (As a general rule, it is better if both parties have some influence over the quantity signed.) The challenger can abuse this protocol to get a signature on any quantity he chooses.

We now turn our attention to secure protocols.

3. Definition of a Secure Protocol

A particular instantiation of an authentication protocol is referred to as a run. Before presenting a definition of a secure protocol, we first consider the properties of what we consider to be a successful run. In a successful run, two communicating parties, Alice and Bob, exchange a number of messages at the end of which they have assurances of each other's identities and furthermore, optionally share a secret key known only to them. For every completed run, each party either accepts or rejects the other's identity and optionally an exchanged key. In a successful run, the run is completed and both parties accept.

Property 1 of a successful run: Both Alice and Bob accept each other's identities. If the authentication involves key exchange, then they both accept the exchanged key also.

The second property of a successful run concerns the records of a protocol run (assuming the participants had each recorded the exchange). To proceed, we require definitions regarding the use of the work match when applied to records of a run (a slightly different definition is given by Bird et al. [5]).

Matching Messages: We say that a message from one record matches a message from another if one record lists the message as incoming, the other record lists the message as outgoing, and all fields of the message relevant to authentication are the same in both records.

The qualification relevant to authentication is necessary to allow individual messages to match even if they are not bit-wise identical. The motivation here is that if a message contains unsigned fields that are cryptographically irrelevant to authentication, then discrepancies in such fields alone should not preclude a message from meeting the definition of matching.

Matching Records of Runs: We say that two records of a run match if their messages can be partitioned into sets of matching messages (each set containing one message from each record), the messages originated by one participant appear in the same order in both records, and the messages originated by the other participant appear in the same order in both records. For simplicity, we do not consider protocols in which messages need not arrive in the order in which they were sent.

Note that messages originated by distinct participants do not have to be in the same order with respect to each other. This allows the case where messages in transit cross. In such a case, each participant will record his own message as having been sent before the crossing message is received.

Property 2 of a successful run: If Alice and Bob have recorded the exchange, then their records of the run will match.

We now distinguish between a successful run and a secure run. To consider a run successful by any reasonable definition, the run must be considered secure in the intuitive sense. On the other hand, it is possible for a run to be unsuccessful even in the absence of security breaches (e.g., if both legitimate parties reject for some reason). It is also always possible that an enemy may delay a legitimate message of a run indefinitely. Suppose that in a particular run, Alice accepts Bob's identity, sends the last message of the protocol to Bob, and then an enemy destroys this message. Assuming Bob must receive this message before accepting Alice's identity, Bob will not accept Alice's identity. Intuitively, while this run is unsuccessful, there have been no security breaches; at the time that Alice accepted Bob's identity (before she sent the last message), Bob's record of the partial run matched Alice's record. For our purposes, such a denial of service attack in itself is not considered a security breach; such problems often must be dealt with by physical security and other techniques.

We are now in a position to define what it means for a run of a (symmetric or asymmetric) mutual authentication protocol to be insecure:

DEFINITION 1: A particular run of a protocol is an insecure run if any party involved in the run, say Alice, executes the protocol faithfully, accepts the identity of another party, and either of the following conditions holds:

At the time that Alice accepts the other party's identity (before she sends or receives a subsequent message), the other party's record of the partial or full run does not match Alice's record.

The exchanged key accepted by Alice is known to someone other than the party whose identity Alice accepted. (This condition does not apply to authentication without key exchange.)

Note that under this definition a conventional key exchange protocol requiring a trusted third party [18] is not secure.

It should be clear that Alice's record, which must match that of the other party in the above definition, is the actual record she has at the point in time at which she has received enough information to carry out any computations required to reach the accept state: messages sent or received subsequent to this are irrelevant.

The goal of the enemy is to cause a run to be insecure. The goal of the designer of the protocol is to make the enemy's task impossible (or computationally infeasible) in all instances. Reversing Definition 1, we get a definition of a secure (symmetric or asymmetric) mutual authentication protocol:

DEFINITION 2: A secure protocol is a protocol for which the following conditions hold in all cases where one party, say Alice, executes the protocol faithfully and accepts the identity of another party:

At the time that Alice accepts the other party's identity (before she sends or receives a subsequent message), the other party's record of the partial or full run matches Alice's record.

It is computationally infeasible for the exchanged key if accepted by Alice to be recovered by anyone other than Alice and possibly the party whose identity Alice accepted. (This condition does not apply to authentication without key exchange.)

By themselves, the above definitions are not particularly helpful in deciding whether a given protocol is secure, in that they do not lead to constructive procedures to either verify or expose weaknesses of a protocol. Nonetheless, these definitions can be applied directly in deciding whether a given potential attack is a real attack. For example, in an authentication with key exchange, suppose an enemy merely intercepts Alice's and Bob's messages and then passes them along unchanged. Intuitively, the enemy has not compromised the system in this case; the parties have accepted each other's identities, have matching records of the run, and exclusively share a secret key. Note that by Definition 1, such a run is not insecure. In other cases a supposed attack may become quite convoluted, and it may not be obvious that the attack amounts to just passing along messages. Definition 1 can be used to distinguish such a pass-along nonattack. In Section 5, this definition serves well in identifying real attacks; in particular, the second condition, which appears trivial, is essential.

While formal analysis techniques have been successfully used to uncover weaknesses in some authentication protocols (see Section 6), proof of correctness is more difficult, and depends heavily on proper modelling of goals and assumptions. Another technique available for uncovering weaknesses is that of exhaustive search with respect to interleaving attacks [5]. Unfortunately, since there are as yet no absolute proofs of correctness, confidence in a protocol develops only over time as experts conduct a continuing analysis of the protocol and fail to find flaws.

4. Desirable Protocol Characteristics

In addition to being secure, there are other desirable characteristics for a protocol.

Perfect Forward Secrecy. An authenticated key exchange protocol provides perfect forward secrecy if disclosure of long-term secret keying material does not compromise the secrecy of the exchanged keys from earlier runs. The property of perfect forward secrecy does not apply to authentication without key exchange.

Direct Authentication. In some authenticated key exchange protocols, authentication is not complete until both parties prove knowledge of the shared secret key by using it in subsequent communications. Such a protocol is called indirect. When authentication is established by the end of each protocol run, the protocol is direct. An indirect protocol can be modified to be direct by adding an exchange of known messages or messages with redundancy encrypted with the exchanged key. For authentication without key exchange, an indirect protocol provides no security because neither party can accept the other's identity.

No Timestamps. While timestamps are convenient for administrative and documentation purposes, it is desirable in practice to avoid relying on their use for security in authentication protocols. Difficulties, precautions, and objections to timestamps are well-documented in the literature [3], [5], [13]. For convenience, we summarize the more notable issues below.

To use timestamps for authentication, all parties must maintain local clocks that are periodically synchronized in a secure manner with a reliable source of time. Between synchronizations with the reliable time source, local clocks may drift. Two parties, Alice and Bob, must allow a time window for timestamps to compensate for local clock drift and the fact that messages take time to cross a network. Alice will accept any timestamp from Bob that is within a window around the time on Alice's local clock as long as Bob has not used this particular time value before. Alice can either store all time values used by all other parties that are within her current window (which is impractical in some communications environments) or she can store the latest time used by each party and insist on strictly increasing time values from each party. However, in the strictly increasing time values case, if Bob uses a time t far into the future for some reason (e.g., severe clock drift or improper synchronization with the reliable time source), then Bob will not be able to communicate with Alice until time t is within her window. To prevent this problem, Alice would have to store time t and not update her record of the latest time value used by Bob. This could potentially lead to a choice among storing large quantities of data, sacrificing communications availability, or sacrificing security. Concerning communications availability, if two parties' local clocks are too far out of synchronization, then the parties cannot communicate. This tends to make those concerned with communications availability want wide time windows which increases storage requirements. While timestamps are convenient from a theoretical point of view, they present a number of practical problems. Protocols based on random challenges do not suffer from these difficulties.

Recently, formal analysis has been used in the verification of authentication protocols [7], [13]. Starting with a list of initial formal beliefs, the objective is to logically derive the stated protocol goal by consuming the list of protocol steps. One of the basic assumptions on which such analysis is typically based is that the parties involved have the ability to check the freshness of timestamps. In fact, one of the main results of the work by Gaarder and Snekkenes is the identification of the security requirement that time clocks be trustworthy in certain protocols. This means that in practice, the security of timestamp-based protocols relies heavily on the proper implementation of synchronized and secure time clocks. Unfortunately, despite much discussion in the literature regarding timestamp-based protocols (e.g., [8], [16]), when it comes to actually implementing such a protocol, the significance of the security of time clocks is easily lost, and furthermore, the costs associated with a proper implementation can be significant.

5. Station-to-Station Protocol

We now introduce a simple, efficient authenticated key exchange protocol called the station-to-station (STS) protocol. The STS protocol has evolved over time; an early version of this work was described at the 1987 International Switching Symposium [21]. We believe that it is secure according to Definition 2 and has a number of other desirable properties. In the remainder of this section, we describe the protocol, discuss its properties, and justify its subtle details by showing how variants of it are vulnerable.

5.1. Basic STS Protocol

The STS protocol consists of Diffie-Hellman key establishment [9], followed by an exchange of authentication signatures. In the basic version of the protocol, we assume that the parameters used for the key establishment (i.e., the specification of a particular cyclic group and the corresponding primitive element $\alpha$) are fixed and known to all users. While we refer to the Diffie-Hellman operation as exponentiation, implying that the underlying group is multiplicative, the description applies equally well to additive groups (e.g., the group of points of an elliptic curve over a finite field). We also assume in this section that Alice knows Bob's authentic public key, and vice versa; this assumption is dropped in the following section.

The protocol begins with one party, Alice, creating a random number x and sending the exponential $\alpha^x$ to the other party, Bob (see diagram below). Bob creates a random number y and uses Alice's exponential to compute the exchange key $K=\alpha^{xy}$. Bob responds with the exponential $\alpha^y$ and a token consisting of his signature on the exponentials, encrypted with K using a suitable symmetric encryption algorithm E (i.e., $E_K(s_B\{\alpha^y, \alpha^x\})$). Alice computes K, decrypts the token using K, and verifies Bob's signature using Bob's public key. Alice sends to Bob her corresponding encrypted signature on the exponentials, $E_K(s_A\{\alpha^x, \alpha^y\})$. Finally, Bob similarly verifies Alice's encrypted signature using K and Alice's public key. The security of the exponential key exchange relies on the apparent intractability of the discrete logarithm problem [24].

Basic STS Protocol

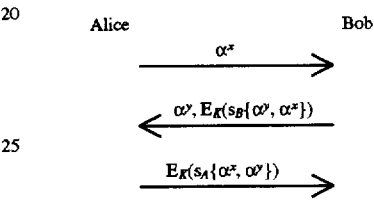

It is possible to create a more symmetric version of this protocol where the parties exchange exponentials first and then exchange encrypted signatures in separate messages. This would make it permissible for the exponential messages to cross, and then the encrypted signature messages to cross. In such a case, neither Alice nor Bob need know who initiated the call. This is desirable, as situations exist in practice (e.g., in both voice telephony and X.25 data transfer) in which at certain implementation levels, it is not known which party initiated a call. This explains why each party forms his signature with his own exponential listed first. If the exponentials were in the same order in both signatures, then Alice and Bob would have to find a way to agree on whose exponential should be listed first (such as by basing the decision on which party initiated the call).

At this point, consider what assurances the STS protocol provides to the participants. From Bob's point of view, as a result of the Diffie-Hellman key exchange, he shares a key known only to him and the other participant, who may or may not be Alice. Our assumption in this section is that Bob knows Alice's public key (this is achieved in the section below through use of certificates). Because Alice has signed the particular exponentials associated with this run, one of which Bob himself has just created specifically for this run, her signature is tied to this run of the protocol. By encrypting her signature with K, Alice demonstrates to Bob that she was the party who created x. This gives Bob assurance that the party he carried the key exchange out with was, in fact, Alice. Alice gets a similar set of assurances from Bob.

The STS protocol has the desirable characteristics discussed in Section 4. Rather than using timestamps, challenges are used. Because the parties demonstrate knowledge of the exchanged key by encrypting their signatures, the authentication is direct. The STS protocol also offers perfect forward secrecy. The only long-term secret keying material stored by users is their secret keys for the signature scheme. If a secret key is compromised, the security of exchanged keys from earlier runs is not affected because Diffie-Hellman key exchange is used; Diffie-Hellman key exchange has no long-term keying material. There are two other desirable properties of the STS protocol. The first is that public key techniques are used to make key management simpler and more secure than is possible using conventional cryptography. If parties generate their own secret keys, these keys need never be disclosed (to anyone, including any supposedly trusted party), even during initialization. The second is that there is no need for communicating parties to contact a central facility on a per-call basis. If certificates are used for distributing public keys (see Section 5.2), once a party has its own certificate and the trusted authority's public key, it can exchange keys with, and authenticate other parties without consulting a central facility. The protocol appears to strike an elegant and difficult balance, being simple and secure without utilizing unnecessary or redundant elements.

To illustrate the need for the features of the STS protocol, it is now demonstrated how the protocol is weakened when the following modifications are made: removing the encryption of the signatures, signing only one's own exponential, signing only the other party's exponential, or uncoupling authentication from key exchange.

Removing encryption on signatures. Consider a modified STS protocol where the signatures on the exponentials are not encrypted with the exchanged key K. Because the exponentials are public information, any other party could sign them as well. Suppose that in the last message of the protocol, an enemy Eve substitutes her own signature on the exponentials for Alice's signature. (If the parties exchange public keys using certificates, Eve would have to substitute her own certificate for Alice's certificate.) This may not seem like a serious attack, as Eve does not know the exchanged key. However, if Bob were a bank, Eve could get credit for a deposit Alice might make. Interestingly, even though Bob has been misled here, Alice is the party who may be hurt.

Having informally discussed why the above run is insecure, we now apply Definition 1. Bob executed the protocol faithfully and accepted Eve's identity, but the exchanged key is known to a different party, Alice. By Definition 1, the run is insecure. Because an insecure run is possible, the modified protocol is insecure.

Signing only one's own exponential. Consider the variant of the STS protocol where each party signs only his own exponential (i.e., Alice's encrypted signature is $E_K(s_A\{\alpha^x\})$ and Bob's is $E_K(s_B\{\alpha^y\})$. We know of no general attack that applies to this case, but there is an attack that applies when the signature scheme is RSA[26], the hash function is the identity function, and Diffie-Hellman key exchange is carried out over GF(p). In this case, Eve can impersonate Alice in a run with Bob by using x=0 as the exponent in the key exchange. Eve's exponential is $\alpha^0=1$, and the exchanged key is $K=\alpha^{xy}=1$. Eve requires the following encrypted signature $$
\begin{aligned}
E_K(s_A\{\alpha^x\}) &= E_1(s_A\{1\}) \\
&= E_1(s_A(1)) \quad \text{because the hash function is the identify function} \\
&= E_1(1) \quad \text{because signing in RSA in exponentiation and } 1^z = 1 \text{ for all } z
\end{aligned}
$$

Eve can compute $E_1(1)$, and hence can impersonate Alice. Although this attack applies only to a specific case, it illustrates a more general problem in signing only one's own exponential: if Eve can obtain a quantity for which she can acquire or compute the discrete logarithm, and can acquire or compute Alice's signature on the quantity, then Eve can use (and reuse) this quantity as an exponential to impersonate Alice. By introducing the second exponential into the data to be signed, an adversary is forced to solve a different instance of the problem in real time each time impersonation is attempted.

Signing only the other party's exponential. Consider the variant of the STS protocol where each party signs only the other party's exponential (i.e., Alice's encrypted signature is $E_K(s_A\{\alpha^y\})$ and Bob's is $E_K(s_B\{\alpha^x\})$). Again, we know of no general attack which applies to this case, but there are some concerns.

In principle, it is imprudent to sign arbitrary text supplied by a potential adversary. In the case at hand, in order for an adversary to recover the signature, he would have to know the key K. To compute K, the adversary would need to know the discrete logarithm of the quantity being signed. While an adversary would not in general know the logarithm of a particular fixed quantity he might desire signed, it is trivial to produce such quantities by preselecting logarithms, and it would appear undesirable to allow an adversary the freedom to acquire signatures on any quantities whose logarithms are known.

In Section 5.3, it is shown that the STS protocol can be reduced to an authentication-only protocol by replacing exponentials with random numbers and removing the encryption on the signatures. If each party were to sign only the other party's exponential, then the authentication-only variant would be subject to the attack on the simple challenge-response outlined in Section 2. Similarly, signing only one's own exponential does not result in a protocol which reduces to a secure authentication-only variation.

Note that even should it turn out that signing both exponentials does not provide more security than simply signing a single exponential, the only added cost in doing the former is additional hashing, which in general is relatively minor. No additional operations involving the signature scheme, symmetric cryptosystem operations, or data transmission are introduced by signing both exponentials rather than one only.

Uncoupling authentication from key exchange. If the STS protocol is modified so that authentication is uncoupled from key exchange by having the parties sign some quantity that is independent of the exponentials, the resulting protocol is subject to the classical intruder-in-the-middle attack (e.g., [27]) on Diffie-Hellman key exchange:

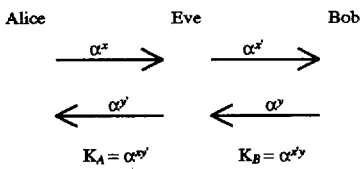

Eve substitutes her own exponentials for Alice's and Bob's exponentials. This results in Alice and Bob calculating two different keys, both of which can be calculated by Eve. Eve shares key $K_A$ with Alice, and key $K_B$ with Bob. During the authentication phase of the run, Eve can pass Alice's encrypted messages to Bob and vice versa by decrypting the messages with one key and re-encrypting with the other. After authentication, Eve is free to passively eavesdrop or to inject her own messages. By Definition 1, this modified protocol is insecure because while Alice executed the protocol faithfully and accepted Bob's identity, the exchanged key is shared with a different party, Eve. There is a similar problem from Bob's point of view.

5.2. STS Protocol in Practice

We now describe the use of the STS protocol in practice, for the specific case where the key exchange is carried out in the multiplicative group of a finite field. For clarity, we focus on prime fields GF(p). Two parameters are required then for Diffie-Hellman key exchange: a primitive element e in GF(p), and a suitable prime p. The prime p should be chosen to preclude Pohlig-Hellman type attacks [25]. In light of recent work on the discrete logarithm problem ([24] for prime fields; [23] for fields of characteristic two), it is prudent to use a distinct field for each user (i.e., for GF(p), a distinct prime p, chosen by the user himself). The best known attacks on Diffie-Hellman key exchange over finite fields are the index-calculus techniques involving a massive pre-computation which yields a database specific to a particular field. The database then allows computation of individual logarithms in that field relatively quickly. If a single field is used for an entire network, a single database allows the compromise of all key exchanges—providing great incentive to attempt to construct the database.

To facilitate the distribution of users' public keys and user-specific Diffie-Hellman parameters, certificates may be used. In addition to these items, a certificate should contain the user's name and the signature of the trusted authority over these data items. The reason for the inclusion of the ($\alpha$, p) pair in the certificate is explained below. The STS protocol is then as follows. To avoid cluttering the formulae the mod p reductions have been omitted.

STS Protocol in practice:

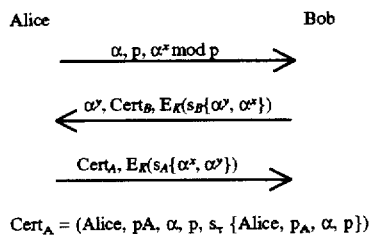

$Cert_A = (Alice, pA, \alpha, p, s_T \{Alice, p_A, \alpha, p\})$

The differences here are as follows. Alice sends her Diffie-Hellman parameters along in the first message; Bob uses these instead of fixed network-wide parameters. Upon receiving the third message, Bob verifies that the Diffie-Hellman parameters sent in the first message agree with those actually in Alice's certificate. In the second message, Bob sends Alice his certificate, from which Alice can extract his authentic public key; Alice verifies authenticity by checking the signature of the trusted authority on Bob's certificate. Similarly, in the third message, Alice sends Bob her certificate, allowing Bob to extract her authenticated public key, after similarly verifying the trusted authority's signature on her certificate. Note that Bob does not need Alice's certificate until the third message, and in fact may not wish to receive it earlier, since this may require having to allocate storage to save the certificate until needed upon receipt of the third message. A further reason for Alice to delay sending her certificate until the third message is to allow both Alice and Bob the option to encrypt their certificates with the exchanged key. Although certificates are, in theory, public information, it may be desirable in some applications to prevent an eavesdropper from seeing them in order to prevent a passive eavesdropper from learning Alice and Bob's identities.

Note that knowledge of the other party's public key is not required to construct and send or to receive and process the first message. If the public key were required at this stage, then introducing certificates would necessitate an additional preliminary message to make the certificate available earlier.

As discussed in Section 5.1, it may be desirable in some cases to allow both parties to send the initial message simultaneously. In this case, some method must be used to establish one of the parties as the dominant party (i.e., the party whose $\alpha$, p pair will be used). The nondominant party would then continue the protocol with the second message. An example of a simple method would be to choose the party with the larger prime p to be dominant.

It is now shown that the protocol is weakened if Diffie-Hellman parameters are not included in certificates.

Removing Diffie-Hellman parameters from certificates. Without Diffie-Hellman parameters in certificates, the enemy, Eve, has the freedom to modify $\alpha$ and p in Alice's first message. Let Alice's exponential be $t=(\alpha^x \mod p)$. Suppose that Eve changes $\alpha$ to be 1 and p to be t−1 (see diagram below). Then Bob's exponential is $1^y \mod (t-1) = 1$, and Bob calculates the exchanged key to be $t^y \mod (t-1) = 1$. Alice calculates the exchanged key to be $1^x \mod p = 1$. Because Eve does not modify the exchanged exponentials and Alice and Bob calculate the same exchanged key, Alice and Bob will accept each other's encrypted signatures.

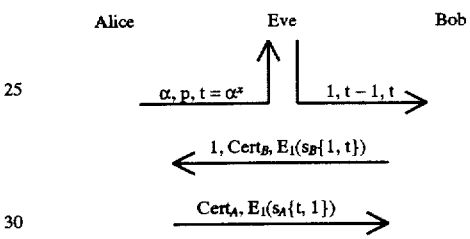

Eve knows the exchanged key and after authentication, she is free to both eavesdrop and inject her own messages. Note that Alice and Bob accepted each other's identities, but their records of the run do not match, and the exchanged key is known to a third party; the modified protocol is thus insecure by our definitions, as well as intuitively.

While it may appear that the above-described substitution is trivial and easily detected by special checks, the potential for compromise remains. More sophisticated or disguised related attacks appear possible, including the possible use of Pohlig-Hellman-weak primes. The fundamental concern is that in order to rely on the believed intractability of the Diffie-Hellman problem, it must be ensured that suitable Diffie-Hellman parameters are in fact used.

5.3. Authentication-Only Version of STS Protocol

It is possible to turn the STS protocol into an authentication-only protocol by replacing the exponentials with random numbers and removing the encryption on signatures:

Authentication-only STS Protocol

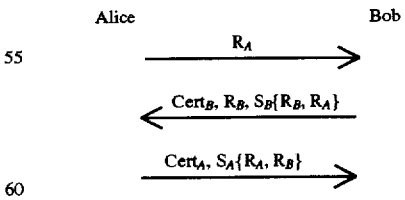

This simplified protocol is essentially the same as the three-way authentication protocol currently proposed by ISO [1]. This is discussed further in the following section.

6. Discussion of Other Protocols

From the intruder-in-the-middle attack on unauthenticated Diffie-Hellman key exchange to spoofs in the spirit of the well-known "grandmaster postal-chess" problem.[1] attacks on authentication protocols are numerous and well-documented in the literature. Burrows, Abadi and Needham analyzed eight protocols and found six to contain redundancies, and four to contain flaws [7, Table 1], including both redundancies and flaws in the CCITT X.509 mutual authentication protocols [30]. To get a flavor of the concerns we have with many of the currently proposed protocols, we briefly discuss two of the four protocols analyzed by Burrows et al.; Kerberos, and one of the X.509 protocols. We also discuss a related ISO protocol.

Kerberos protocol. The popular Kerberos protocol [18], based on symmetric cryptosystems, has several features which make it somewhat undesirable in various applications. These include the use of timestamps (discussed earlier), the requirement of an on-line authentication server, and redundancies in the protocol itself. These and further issues are discussed by Bellovin and Merritt [3].

Three-pass CCITT X.509 authentication protocol. The CCITT X.509 recommendation [30] is a very widely known internationally standardized authentication protocol based on public-key cryptography. The one and two-pass X.509 protocols require timestamps, while timestamps are redundant in the three-pass protocol; the specification allows that the timestamp field may be zero in this latter case (making the three-pass protocol practical, although it would be preferable if no field at all had to be allocated for timestamps). Some concerns regarding the protocol are now summarized. The final message of this protocol is Alice's signature on both Bob's challenge and Bob's identity: $s_A \{R_B, Bob\}$.[2] This allows Bob to obtain the signature of Alice on a quantity over which Bob has control. This is undesirable, although it is not clear how to use this to mount a direct attack. A second concern involves the suggested use of the optional encrypted data field in the protocol to accomplish key exchange; this use does not guarantee perfect forward secrecy.[3] A further issue with the use of this field is that there is no guarantee that the sender of the encrypted data actually knows the encrypted data itself, and in fact an adversary can pass off another party's encrypted data as his own [7], [13]. A third concern [17] is the restriction that the signature system used must be capable of both signing and encrypting data, which rules out many candidate signature schemes including the proposed NIST Digital Signature Algorithm [10].

ISO three-way protocol. As noted in Section 5.3, the authentication-only version of the STS protocol is essentially the same as the three-way protocol currently proposed by ISO [1]. The differences are that the ISO protocol allows redundant copies of the random numbers, optional fields for the identity of the intended recipient of a message, and optional fields for arbitrary text. Due to limitations of authentication-only protocols as discussed earlier, in most applications it is expected that the key establishment functionality of the ISO protocol (provided by the optional text fields both within and outside the signed portion of each message) will be employed. Recalling the concern noted above in X.509, care must be taken in the use of these fields; furthermore, note that their use to transfer encrypted session keys does not guarantee perfect forward secrecy.

Attack on a specific authentication protocol. To augment the literature documenting attacks on specific protocols, and to further emphasize how easily flaws can be introduced and overlooked, we now consider the following (flawed) variation of the ISO authentication exchange. In fact, this variation was a preliminary version of the protocol. Here, Alice is allowed to use a new random number $R'_A$ in place of $R_A$ in the third message; $R'_A$ is then also sent along as an additional cleartext field in the third message. In this modified protocol, an enemy Eve can authenticate herself as Alice to an unsuspecting party Bob as follows (see diagram below). Eve call Bob, pretending to be Alice, sending a challenge to Bob; Eve responds to Bob's counter-challenge by calling Alice and getting her to respond correctly to the challenge; Eve then drops the call with Alice and passes the correct response along to Bob, thus completing the authentication from Bob's point of view. Note that the attack is successful even if the identity of the intended recipient of each message is incorporated within the signed portion of each authentication token, as is optionally permissible in the formal definition of the related ISO protocol. To emphasize this, these principals' identities are included, and annotated with asterisks, in the attack detailed below. For simplicity, certificates are not shown.

Regarding other attacks documented in the literature, we note that Bird et al. ([5], Section 4) detail on attack on a specific protocol. This is a specific case of the general class of refection attacks in which a challenger is tricked into providing answers to his own questions [19].

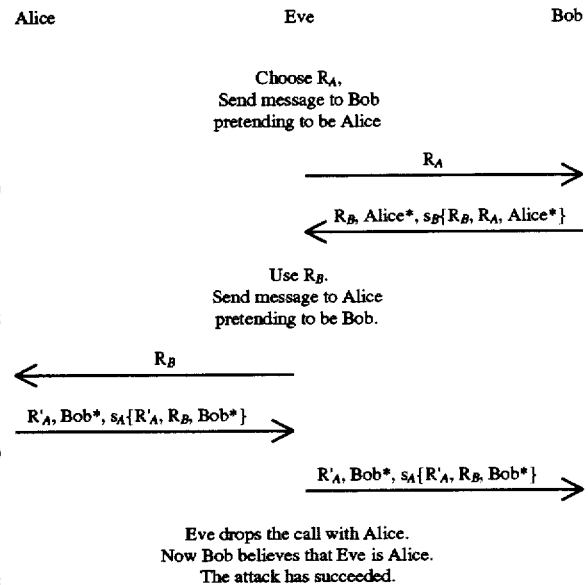

Eve drops the call with Alice.
Now Bob believes that Eve is Alice.
The attack has succeeded.

7. Concluding Remarks

Below are some general principles that appear prudent to follow in the design of authentication protocols. While many of these have been previously observed, we find it convenient to collect them here.

1. Authentication and key exchange must be linked. If authentication and key exchange are independent, then an attacker could allow two parties to carry out authentication unhindered, and could take over one party's role in key exchange. This would allow the attacker to impersonate a valid party after authentication and key exchange are completed.

2. Asymmetry in a protocol is desirable. Symmetries in a protocol should be used with caution, due to both the possibility of reflection attacks, and attacks in which responses from one party can be reused within a protocol. As an obvious illustrative example, the authentication responses of each of two parties should not be identical.

3. Messages within a particular protocol run should be logically linked or chained in some manner, to prevent the reuse of previous messages or the introduction of messages from a parallel run. The objective here is to preclude replay attacks and interleaving attacks. Messages should also be linked to the current time frame (e.g., through incorporation of recently generated random numbers). The specific attack detailed in Section 6 is possible due to a lack of such chaining of messages; similarly, the middleperson attack discussed by Gengio et al. [4] is possible in protocols which fail to address this principle.

4. A party carrying out a cryptographic operation (serving as a signature) should be able to incorporate into the data being operated on a reasonable amount of data which he himself randomly selects. In other words, a protocol should not require a party to carry out a cryptographic operation on inputs which may be entirely under the control of an adversary. This "add your own salt" principle is aimed at preventing an adversary from obtaining responses to specific questions he himself may not be able to answer. This should also prevent so-called chosen-ciphertext attacks ([6, p. 27]). Related to this principle, we note the following principle paraphrased from Moore [20, section II]:

5. Valid signatures should result from the transformation of a message from a message space that is a sparse subset of the domain of the signature function. For example, requiring redundancy, or some other expectation, in the data to be signed, may thwart attacks whereby an adversary attempts to forge new signatures by combining previously obtained valid signatures. For the STS protocol, the hash function selected to hash the exponentials should produce a result smaller than the maximum size of input allowed to the signature process, to allow redundancy to be added to the hash result before signing.

The proposed station-to-station protocol satisfies the above principles, as well as the desirable properties noted in Section 4 (perfect forward secrecy, direct authentication, no requirement of timestamps). Its compatibility with the emerging ISO authentication protocol, and its ability to provide key establishment within this framwork, add to its appeal. Furthermore, the station-to-station protocol uses the minimum number of messages required for a random-number-based challenge-response mutual authentication (three), and requires only one signature generation, one signature verification, and two encryption operations by each party (with an additional signature verification if certificates are used on a per-run basis to bind a user's identity and public key).

Any appropriate signature scheme may be used in the STS protocol, including the Digital Signature Algorithm (DSA) recently proposed by NIST [10]. For reasons of practical efficiency, an obvious candidate signature scheme is RSA [26]. Similarly, any appropriate symmetric encryption algorithm may be used. In some applications it may be desirable to avoid the use of an encryption algorithm. One method to consider for avoiding the need the need for an encryption algorithm $E_K$ is as follows: replace the encrypted signature by a signature plus a message authentication code (MAC) over the signature; i.e., replace $E_K(s)$, where $s=s_B\{\alpha^Y, \alpha^x\}$ (as in Section 5.1), by $(s, M_K(s))$, where $M_K$ is a MAC with key K. The receiving party would then verify both the signature and the MAC over the signature. While allowing one to avoid the requirement of an encrypt/decrypt capability (which e.g., both Kerberos and the X.509 protocols require), a disadvantage of this approach is the additional data transfer it entails.

Acknowledgments

The authors would like to thank their colleagues for their support and ideas related to the protocols in question, and in particular discussions with Carlisle Adams and Warwick Ford.

Notes

* This work was done while Whitfield Diffie was with Northern Telecom, Mountain View, Calif.

1. A novice who engages in two simultaneous chess games with two distinct grandmasters, playing white pieces in one game and black in the other, can take his opponents' moves in each game and use them in the other to guarantee himself either two draws or a win and a loss, and thereby unfairly have his chess rating improved.

2. In an early version of X.509, the final message was simply $s_A\{R_B\}$; the recommendation has since been formally updated.

3. Note that use of RSA [26] in the obvious manner to achieve key exchange similarly does not guarantee perfect forward secrecy.

References

1. Information Technology—Security Techniques. Entity Authentication Mechanisms—Part 3: *Entity Authentication Using a Public-Key Algorithm* (CD 9798-3), November 1991 (ISO/IEC JTC1/SC27 Committee Draft #4).
2. Bauspiess, F. and Knobloch, H.-J. 1990. How to keep authenticity alive in a computer network. Advances in Cryptology—Eurocript 89, (J. J. Quisquater and J. Vandewalle, eds.) *Lecture Notes in Computer Science* 434: 38–46, Berlin/New York: Springer-Verlag.
3. Bellovin, S. M. and Merritt, M. 1990. Limitations of the Kerberos authentication system. *ACM Computer Communication Review* 20 (5):119–132.
4. Bengio, S., Brassard, G., Desmedt, Y. G., Coutier, C., Quisquater, J.-J. 1991. Secure implementation of identification system. *J. Cryptology* 4 (3):175–183.
5. Bird, R., Gopal, I., Herzberg, A., Janson, P., Kutten, S., Molva, R., and Yung, M. Forthcoming. Systematic design of two-party authentication protocols. *Advances in Cryptology—Crypto '91*, Berlin/New York: Springer-Verlag.
6. Brassard, G. 1988. *Modern Cryptology*, Lecture Notes in Computer Science 325. Berlin/New York: Springer Verlag.
7. Burrows, M., Abadi, M., and Needham, R. 1990. A logic of authentication. *ACM Transactions on Computer Sciences* 8 (1):18-36.
8. Denning, D. E. and Sacco, G. M. 1981. Timestamps in key distribution protocols. *Comm. ACM* 24 (8):533–536.
9. Diffie, W. and Hellman, M. E. 1976. New directions in cryptography. *IEEE Trans. Info. Theory* IT-22 (6):644–654.
10. (proposed U.S. FIPS) Digital Signature Standard (DSS), announced in *Federal Register*, vol. 56, no. 169 (Aug. 30, 1991), 42980–42982.
11. ElGamal, T. 1988. A public key cryptosystem and a signature scheme based on discrete logarithms. *IEEE Trans. Info. Theory* IT-31 (4):469–472.
12. Fiat, A. and Shamir, A. 1987. How to prove yourself: practical solutions to identification and signature problems. *Advances in Cryptology—Crypto* 86 (A. Odlyzko, ec.), *Lecture Notes in Computer Science* 263:196–194, Berlin/New York: Springer-Verlag.
13. Gaarder, K. and Snekkenes, E. 1991. Applying a formal analysis technique to CCITT X.509 strong two-way authentication protocol. *J. Cryptology* 3 (2):81–98.
14. Guillou, L. C.and Quisquater, J.-J. 1988. A practical zero-knowledge protocol fitted to security microprocessing minimizing both transaction and memory. *Advances in Cryptology—Eurocrypt '88*, (C. G. Günther, (ed.), *Lecture Notes in Computer Science* 330:123–128, Berlin/New York: Springer-Verlag.

15. Günther, C. G. 1990. An identity-based key-exchange protocol. *Advances in Cryptology—Eurocrypt 89*, (J.-J. Quisquater and J. Vanewalle, eds.), *Lecture Notes in Computer Science* 434:29–37, Berlin/New York:Springer-Verlag.

16. Haber, S. and Stornetta, W. S. 1991. How to time-stamp a digital document. *J. Cryptology* 3 (2):99–111.

17. I'Anson, C. and Michell, C. 1990. Security defects in CCITT Recommendation X.509—The Directory Authentication Framework. *Computer Communication Review* 20 (2):30–34.

18. Kohl, J. and Neuman, B. C. 1991. The Kerberos network authentication service. MIT Project Athena Version 5.

19. Mitchell, C. 1989. Limitations of challenge-response entity authentication. *Electronic Letters* 25 (17):195–196.

20. Moore, J. H. 1988. Protocol failures in cryptosystems. *Proc. of the IEEE* 76 (5):594–602.

21. O'Higgins, B., Diffie, W., Strawczynski, L. and de Hoog, R. 1987. Encryption and ISDN-A Natural fit. *In Proc. 1987 International Switching Symposium*, Pheonix Ariz., pp. A1141-7.

22. Okamoto, E. and Tanaka, K. 1989. Key distribution system based on identification information. *IEEE J. Selected Areas in Comm.* 7 (4):481–485.

23. Odlyzko, A. M. 1985. Discrete logarithms in finite fields and their cryptographic significance. *Advances in Cryptology—Eurocrypt 84*, (T. Beth, N. Cot and I. Ingemarsson, eds.), *Lecture Notes in Computer Science* 209:224–314, Berlin/New York: Springer-Verlag.

24. LaMacchia, B. A. and Odlyzko, A. M. 1991. Computation of discrete logarithms in prime fields. *Designs, Codes and Cryptography 1* (1):47–62.

25. Pohlig, S. C. and Hellman, M. 1978. An improved algorithm for computing logarithms over GF(p) and its cryptographic significance. *IEEE Transactions on Information Theory* IT-24:106–110.

26. Rivest, R. L., Shamir, A. and Adleman, L. 1978. A method for obtaining digital signatures and public-key cryptosystems. *Comm. ACM* 21:120–126.

27. Rivest, R. L. and Shamir, A. 1984. How to expose an eavesdropper. *Comm. ACM* 27 (4):383–395.

28. Schnorr, C.P. 1990, 1991. Efficient signature generation by smart cards. *J. Cryptology* 4 (3):161–174; see also: Efficient identification and signatures for smart cards. *Advances in Cryptology—Crypto 89*, (G. Brassard, ed.), *Lecture Notes in Computer Science* 435:239–251, Berlin/New York: Springer-Verlag.

29. Shamir, A. 1985. Identity-based cryptosystems and signature schemes. *Advances in Cryptology—Crypto 84*, (G. R. Blakley and D. Chaum, ed.), *Lecture Notes in Computer Science* 196:47–53, Berlin/New York: Springer-Verlag.

30. CCITT Blue Book Recommendation X.509, *The Director-Authentication Framework*, 1988. Geneva, March 1988; amended by resolution of Defect 9594/016 (IQ 1991). Also ISO 9594-8.

I claim:

1. A computer-readable medium storing a data structure for secure distribution of software from a distributor to a recipient, said data structure comprising:

(a) a cryptographically secured representation of said software, said cryptographically secured representation having been secured by a first encryption key;

(b) a cryptographic certification, by a certifier, of a first decryption key corresponding to said first encryption key; and (c) an identifier of said distributor; said cryptographically secured representation, cryptographic certification and identifier collectively defining a software passport which enables said recipient thereof (i) to cryptographically verify said first decryption key using a second, preexisting decryption key unrelated to said distributor and obtained by said recipient without specific knowledge of said certifier, and (ii) to cryptographically verify said software using said verified first decryption key.

2. The computer-readable medium of claim 1 wherein said software passport includes said first decryption key.

3. The computer-readable medium of claim 2 wherein said software includes a binary representation of a computer program.

4. The computer-readable medium of claim 3 wherein said software passport includes a validity date of said computer program.

5. The computer-readable medium of claim 2 wherein said first decryption key and said first encryption key are a public-private cryptographic key pair.

6. The computer-readable medium of claim 5 wherein said cryptographically secured representation includes a message digest of at least a portion of said software, said message digest having been encrypted with said first encryption key.

7. The computer-readable medium of claim 2 wherein said cryptographic certification is secured by a second encryption key corresponding to said second decryption key, and wherein said second keys are a private-public cryptographic key pair.

8. The computer-readable medium of claim 2 wherein said cryptographic certification includes a message digest of said first decryption key, said message digest having been encrypted with said second encryption key.

9. The computer-readable medium of claim 2 wherein said software has been encrypted.

10. The computer-readable medium of claim 9 wherein said software is subject to intellectual property protection.

11. The computer-readable medium of claim 9 wherein said sofaware is subject to an access fee.

12. The computer-readable medium of claim 2 wherein said cryptographic certification includes said identifier.

13. The computer-readable medium of claim 2 wherein said identifier includes information about said software.

14. The computer-readable medium of claim 2 wherein said cryptographic certification includes a validity date thereof.

15. The computer-readable medium of claim 1 wherein said cryptographic certification represents an assurance of a skill of said distributor by said certifier.

16. The computer-readable medium of claim 15 wherein said first decryption key and said first encryption key are a public-private cryptographic key pair.

17. The computer-readable medium of claim 16 wherein said cryptographically secured representation includes a message digest of at least a portion of said software, said message digest having been encrypted with said first encryption key.

18. The computer-readable medium of claim 15 wherein said cryptographic certification is secured by a second encryption key corresponding to said second decryption key, and wherein said second keys are a private-public cryptographic key pair.

19. The computer-readable medium of claim 18 wherein said cryptographic certification includes a message digest of said first decryption key, said message digest having been encrypted with said second encryption key.

20. The computer-readable medium of claim 15 wherein said software has been encrypted.

21. The computer-readable medium of claim 1 wherein said second decryption key is stored at a computing platform of said recipient, and where said certifier is a provider of least a portion of said computing platform.

22. The computer-readable medium of claim 21 wherein said second decryption key is a public key of said platform provider and where said first decryption key and said first encryption key are a public-private cryptographic key pair.

23. A method for secure software distribution from a distributor to a recipient comprising the steps of:
 (a) receiving, at a recipient's location, a plurality of elements including:
  (i) software;
  (ii) a cryptographically secured representation of said software, said cryptographically secured representation having been secured by a first encryption key;
  (iii) an identifier of said distributor; and
  (iv) a cryptographic certification, by a certifier, of a first decryption key corresponding to said first encryption key;
 said received elements defining a software passport including at least elements (ii), (iii) and (iv); and
 (b) cryptographically verifying said first decryption key using a second, preexisting decryption key unrelated to said distributor and obtained by said recipient without specific knowledge of said certifier; and
 (c) cryptographically verifying said software using said verified first decryption key.

24. The method of claim 23 where said software passport includes said first decryption key.

25. The method of claim 24 where said software includes a binary representation of a computer program.

26. The method of claim 25 where said software passport includes a validity date of said computer program, and where said step of verifying said software includes checking said validity date.

27. The method of claim 25 where said step of verifying said software includes checking for the presence of said cryptographically secured representation.

28. The method of claim 27 where said step of verifying said software includes:
 (a) decrypting said cryptographically secured representation using said first decryption key to yield a first message digest of at least a portion of said software;
 (b) computing a second message digest on said at least a portion of said received software; and
 (c) comparing said first and second message digests.

29. The method of claim 25 where said step of verifying said software includes checking for the presence of said cryptographic certification.

30. The method of claim 29 where said step of verifying said software includes:
 (a) decrypting said cryptographic certification using said second decryption key to yield a first message digest of said first decryption key;
 (b) computing a second message digest on said received first decryption key; and comparing said first and second message digests.

31. The method of claim 25 where said binary representation of said computer program has been encrypted.

32. The method of claim 31 where said computer program is subject to intellectual property protection.

33. The method of claim 32 where said computer program is subject to an access fee.

34. The method of claim 24 where said identifier is included in said cryptographic certification.

35. The method of claim 24 where said identifier includes information about said software.

36. The method of claim 24 where said software passport is received over a network.

37. The method of claim 24 where said cryptographic certification includes a validity date thereof.

38. The method of claim 24 where said second decryption key is stored at a computing platform of said recipient, and where said certifier is a provider of at least a portion of said computing platform.

39. The method of claim 38 where said second decryption key is a public key of said platform provider and where said first decryption key and said first encryption key are a public-private cryptographic key pair.

40. The method of claim 23 where said cryptographic certification represents an assurance of a skill of said distributor by said certifier.

41. The method of claim 40 where said step of verifying said software includes checking for the presence of said cryptographically secured representation.

42. The method of claim 41 where said step of verifying said software includes:
 (a) decrypting said cryptographically secured representation using said first decryption key to yield a first message digest of at least a portion of said software;
 (b) computing a second message digest on said at least a portion of said received software; and
 (c) comparing said first and second message digests.

43. The method of claim 40 where said step of verifying said software includes checking for the presence of said cryptographic certification.

44. The method of claim 43 where said step of verifying said software includes:
 (a) decrypting said cryptographic certification using said second decryption key to yield a first message digest of said first decryption key;
 (b) computing a second message digest on said received first decryption key; and
 (c) comparing said first and second message digests.

45. The method of claim 40 where said binary representation of said computer program has been encrypted.

46. A method for licensing of a software distributor by a certifier, comprising the steps of:
 (a) receiving, at a certifier's location, an identifier of said distributor;
 (b) verifying a qualification of said distributor against a predetermined licensing criterion; and
 (c) performing a first cryptographic operation on said identifier to produce a cryptographic certification of said distributor;
 (d) said cryptographic certification enabling cryptographic verification by a recipient thereof using a preexisting decryption unrelated to said distributor, and obtained by said recipient without specific knowledge of said certifier.

47. The method of claim 46 where said identifier includes a public key associated with said distributor.

48. The method of claim 47 where said step of performing said first cryptographic operation includes:
 (a) computing a message digest on said public key; and
 (b) encrypting said message digest with an encryption key corresponding to said preexisting decryption key.

49. The method of claim 47 where: (a) said preexisting decryption key is pre-stored at a computing platform of a recipient of said certification and (b) said certifier is a provider of at least a portion of said platform.

50. A method for secure software distribution from a distributor to a recipient, comprising the steps of:

(a) identifying software that is to be distributed to a recipient;

(b) using a first encryption key to perform a first cryptographic operation on said software to form a cryptographically secured representation of said software;

(c) obtaining, from a certifier, a cryptographic certification of a first decryption key corresponding to said first encryption key; and (d) generating a software passport for said recipient, said software passport including at least said cryptographically secured representation, said cryptographic certification, and an identifier of said distributor; where said software passport enables said recipient thereof (i) to cryptographically verify said first decryption key using a second, preexisting decryption key unrelated to said distributor and obtained without specific knowledge of said certifier, and (ii) to cryptographically verify said software using said verified first decryption key.

51. The method of claim 50 where said software passport includes said first decryption key.

52. The method of claim 51 where said software includes a binary representation of a compute program.

53. The method of claim 52 where said software passport further includes a validity date of said computer program.

54. The method of claim 51 where said first decryption key and said first encryption key are a public-private cryptographic key pair.

55. The method of claim 54 where said step of using a first encryption key to perform a first cryptographic operation includes:

(a) computing a message digest of at least a portion of said software; and (b) encrypting said message digest with said first cryptographic key.

56. The method of claim 51 where said cryptographic certification is secured by a second encryption key corresponding to said second decryption key, and where said second keys are a private-public cryptographic key pair.

57. The method of claim 56 where said cryptographic certification includes a message digest of said first decryption key, said message digest having been encrypted with a second encryption key.

58. The method of claim 51 where said software has been encrypted.

59. The method of claim 58 where said software is subject to intellectual property protection.

60. The method of claim 58 where said software is subject to an access fee.

61. The method of claim 51 where said step of obtaining said cryptographic certification includes receiving said identifier.

62. The method of claim 51 where said identifier includes information about said software.

63. The method of claim 51 where said software passport is received over a network.

64. The method of claim 51 where said cryptographic certification includes a validity date thereof.

65. The method of claim 51 where said second decryption key is stored at a computing platform of said recipient, and where said certifier is a provider of at least a portion of said computing platform.

66. The method of claim 65 where said second decryption key is a public key of said platform provider and where said first decryption key and said first encryption key are a public-private cryptographic key pair.

67. The method of claim 50 where said cryptographic certification represents an assurance of a skill of said distributor by said certifier.

68. The method of claim 67 where said first decryption key and said first encryption key are a public-private cryptographic key pair.

69. The method of claim 68 where said step of using a first encryption key to perform a first cryptographic operation includes:

(a) computing a message digest on at least a portion of said software; and (b) encrypting said message digest with said first encryption key.

70. The method of claim 67 where said cryptographic certification is secured by a second encryption key corresponding to said second decryption key, and where said second keys are a public-private cryptographic pair.

71. The method of claim 70 where said cryptographic certification includes a message digest of said first decryption key, said message digest having been encrypted with said second encryption key.

72. The method of claim 67 where said software has been encrypted.

* * * * *